(12) United States Patent
Goto et al.

(10) Patent No.: US 11,959,883 B2
(45) Date of Patent: Apr. 16, 2024

(54) DIAGNOSTIC APPARATUS AND DIAGNOSTIC METHOD

(71) Applicant: KABUSHIKI KAISHA TOSHIBA, Tokyo (JP)

(72) Inventors: Tatsuhiko Goto, Kawasaki (JP); Akihiko Enamito, Kawasaki (JP); Osamu Nishimura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/821,946

(22) Filed: Aug. 24, 2022

(65) Prior Publication Data

US 2023/0258605 A1 Aug. 17, 2023

(30) Foreign Application Priority Data

Feb. 14, 2022 (JP) .................................. 2022-020743

(51) Int. Cl.
*G01N 29/11* (2006.01)
*G01N 29/04* (2006.01)
*G01N 29/44* (2006.01)

(52) U.S. Cl.
CPC ........... *G01N 29/11* (2013.01); *G01N 29/045* (2013.01); *G01N 29/4445* (2013.01); *G01N 2291/015* (2013.01); *G01N 2291/0258* (2013.01); *G01N 2291/105* (2013.01)

(58) Field of Classification Search
CPC .. G01N 29/11; G01N 29/045; G01N 29/4445; G01N 2291/015; G01N 2291/0258; G01N 2291/105; G01N 2291/0232
See application file for complete search history.

(56) References Cited

U.S. PATENT DOCUMENTS

| | | | |
|---|---|---|---|
| 10,620,169 B2 | 4/2020 | Enamito et al. | |
| 2014/0311245 A1* | 10/2014 | Horoshenkov | .... G01N 29/4454 73/592 |
| 2018/0307818 A1* | 10/2018 | Yano | .................... G10L 21/0208 |
| 2022/0150620 A1 | 5/2022 | Enamito et al. | |
| 2022/0301539 A1 | 9/2022 | Goto | |

(Continued)

FOREIGN PATENT DOCUMENTS

| | | |
|---|---|---|
| JP | 05-118965 A | 5/1993 |
| JP | 08-12106 A | 1/1996 |
| JP | 2656307 B2 | 9/1997 |

(Continued)

*Primary Examiner* — Xin Y Zhong
(74) *Attorney, Agent, or Firm* — Oblon, McClelland, Maier & Neustadt, L.L.P.

(57) ABSTRACT

According to an embodiment, a diagnostic apparatus includes a sound-emitting unit, at least one measurement unit, and a processor. The sound-emitting unit includes a plurality of speakers arranged at equal angular intervals on a circumference of a circle, and is configured to emit a first vibration sound to a target by using the speakers. The at least one measurement unit is arranged on a central axis of the circle, and is configured to measure a vibration of the target generated in response to the first vibration sound, or a second vibration sound radiated from the target due to the vibration. The processor is configured to diagnose the target based on an output from the at least one measurement unit.

11 Claims, 24 Drawing Sheets

(56) References Cited

U.S. PATENT DOCUMENTS

2023/0042853 A1* 2/2023 Bouaoua ................ G01N 29/46
2023/0086637 A1   3/2023 Goto et al.

FOREIGN PATENT DOCUMENTS

| JP | 3571949 B2    | 9/2004  |
|----|---------------|---------|
| JP | 2015-219138 A | 12/2015 |
| JP | 6457456 B2    | 1/2019  |
| JP | 6773612 B2    | 10/2020 |
| JP | 2021-124439 A | 8/2021  |
| JP | 2022-77684 A  | 5/2022  |
| JP | 2022-143056 A | 10/2022 |
| JP | 2023-44402 A  | 3/2023  |

* cited by examiner

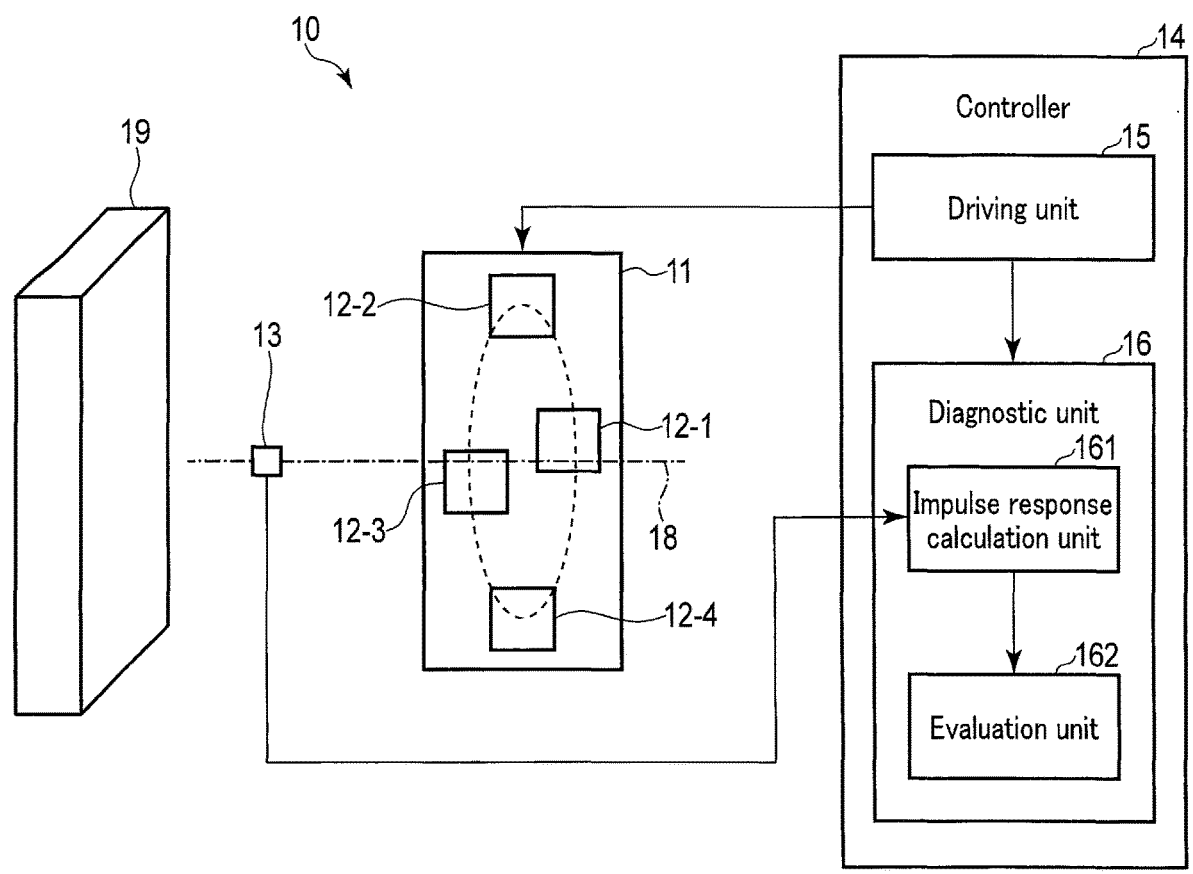
F I G. 1

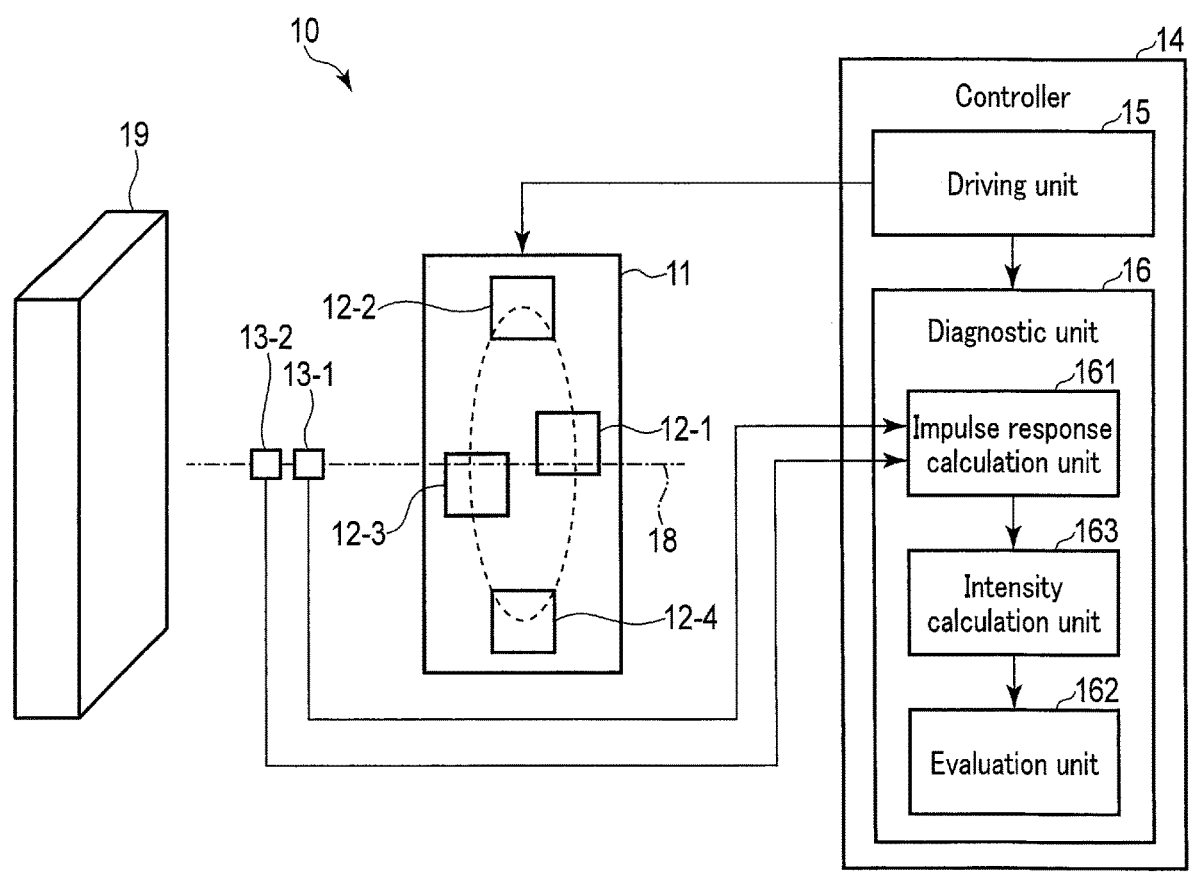
F I G. 2

Radius: Small
Spatial resolution: High
Traverse time: Long

Radius: Large
Spatial resolution: Low
Traverse time: Short

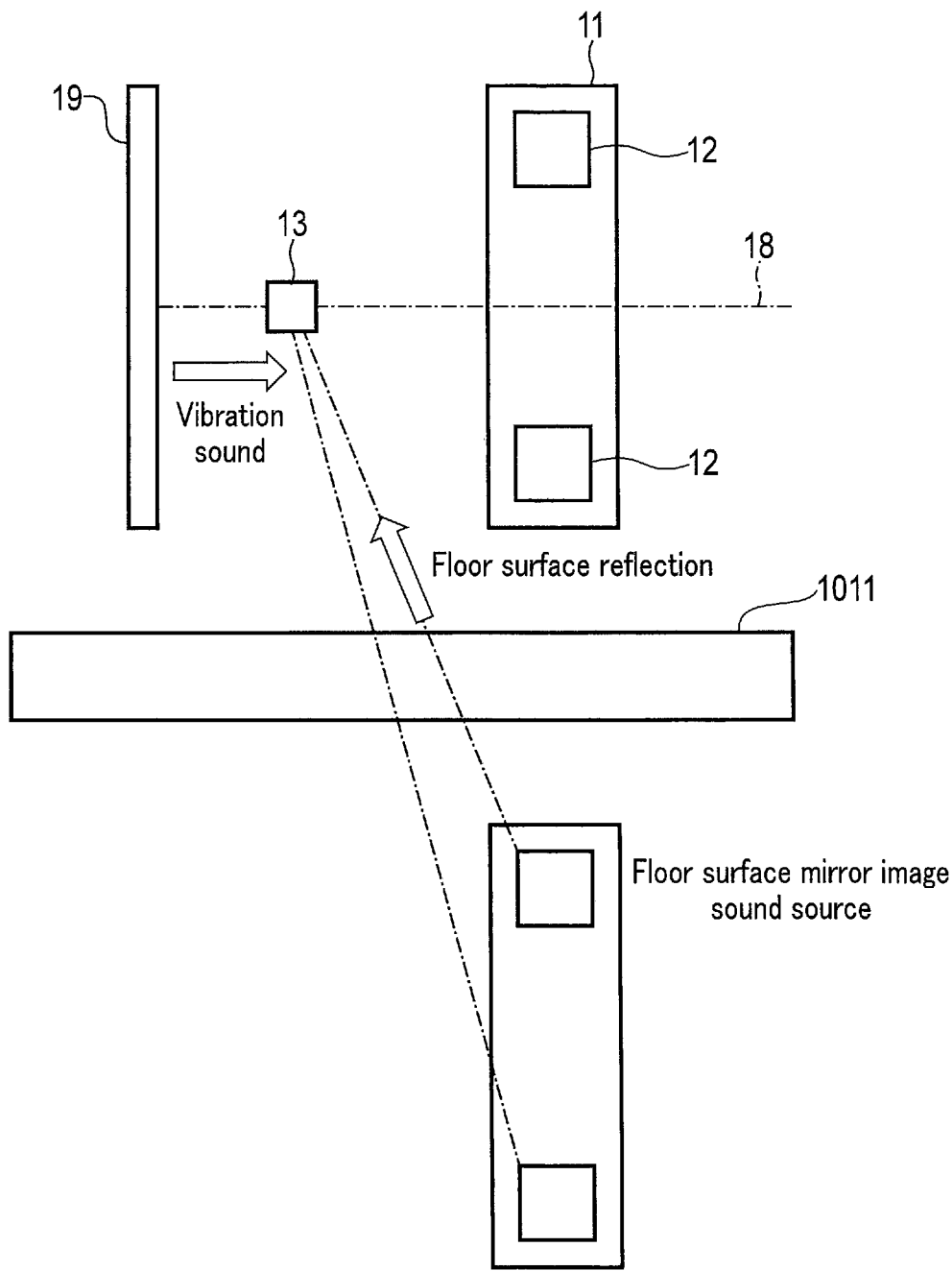
F I G. 11

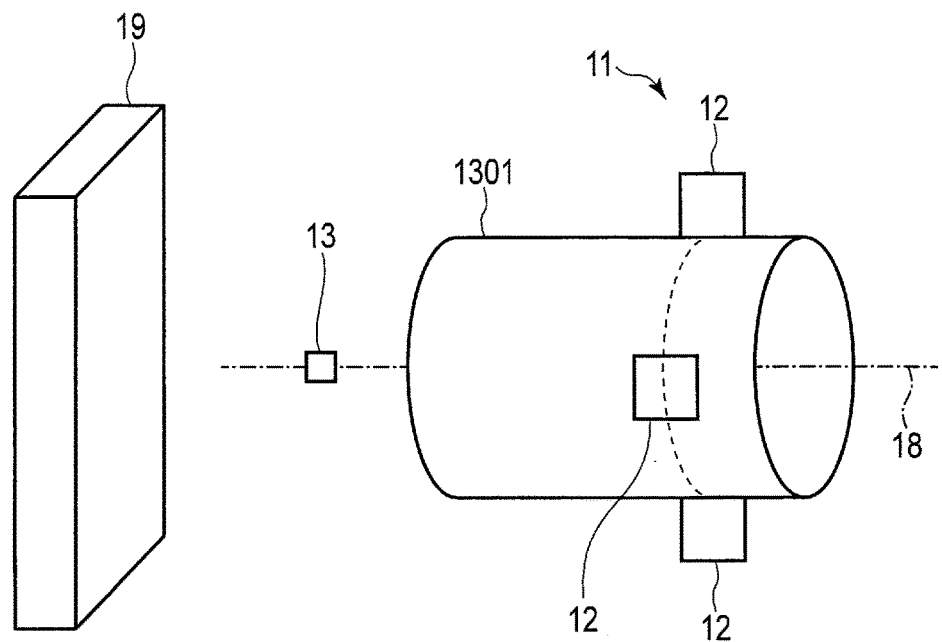
F I G. 13
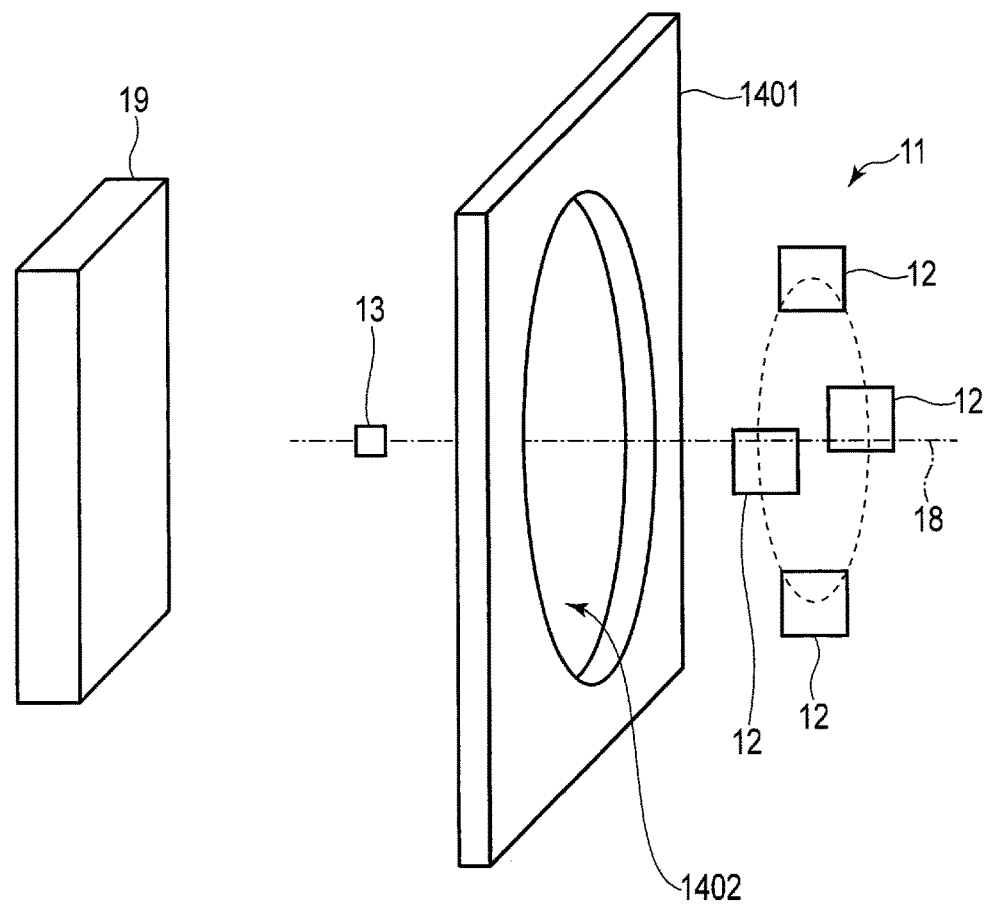
F I G. 14

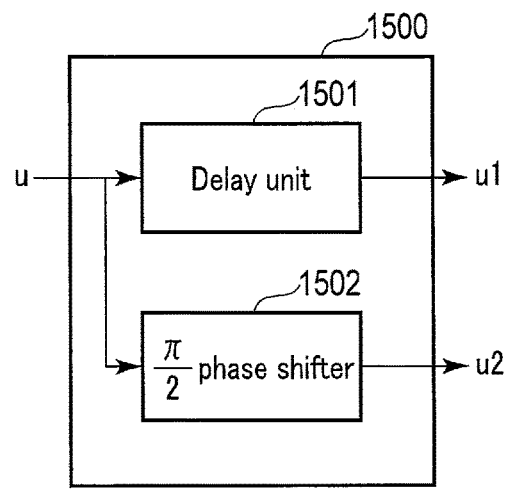
F I G. 15
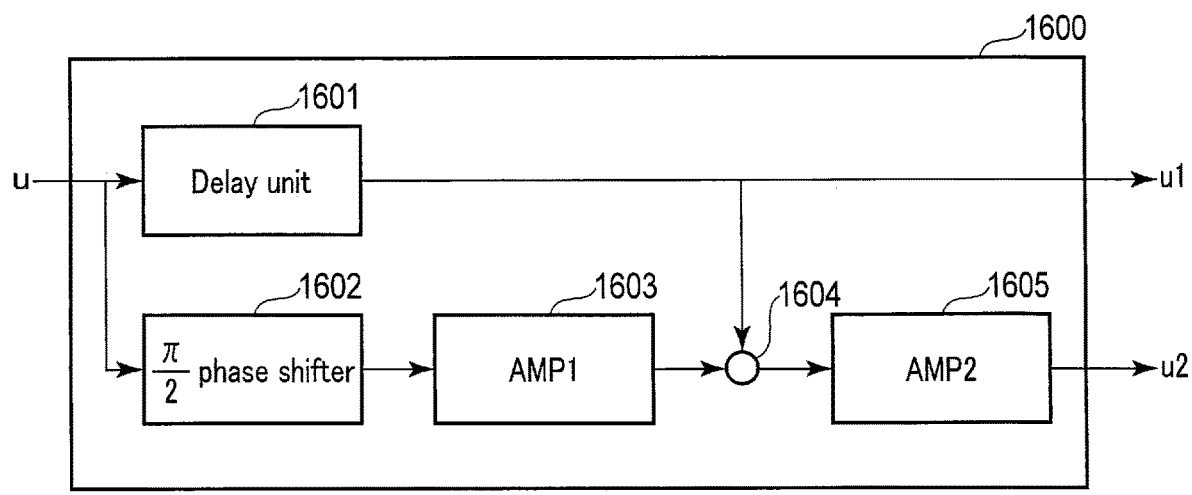
F I G. 16

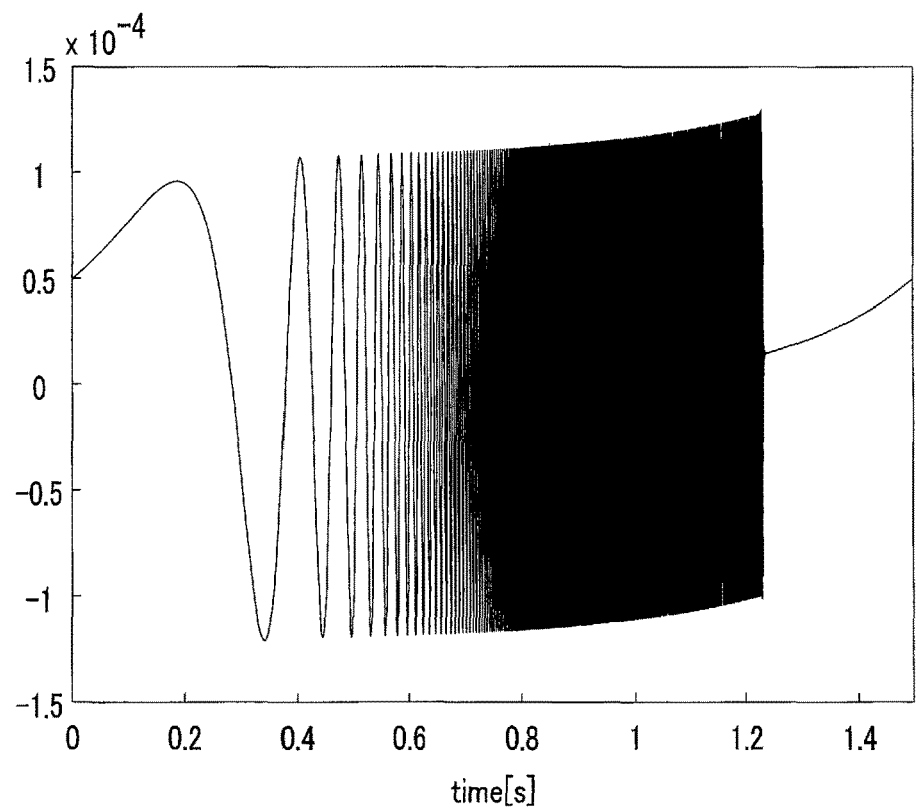
F I G. 20
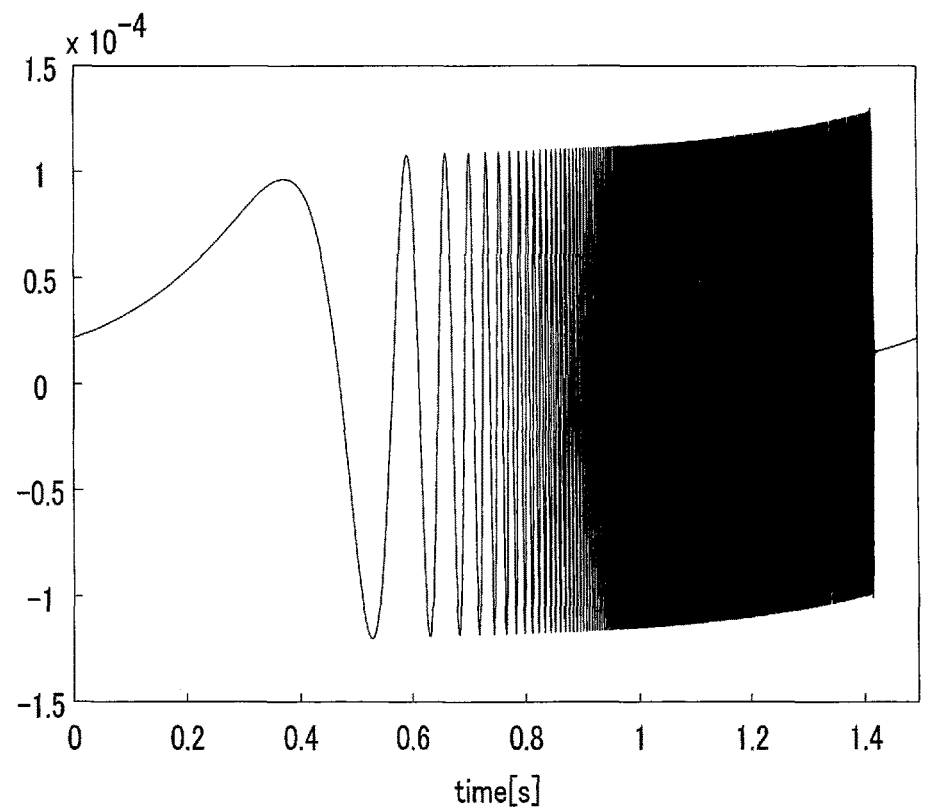
F I G. 21

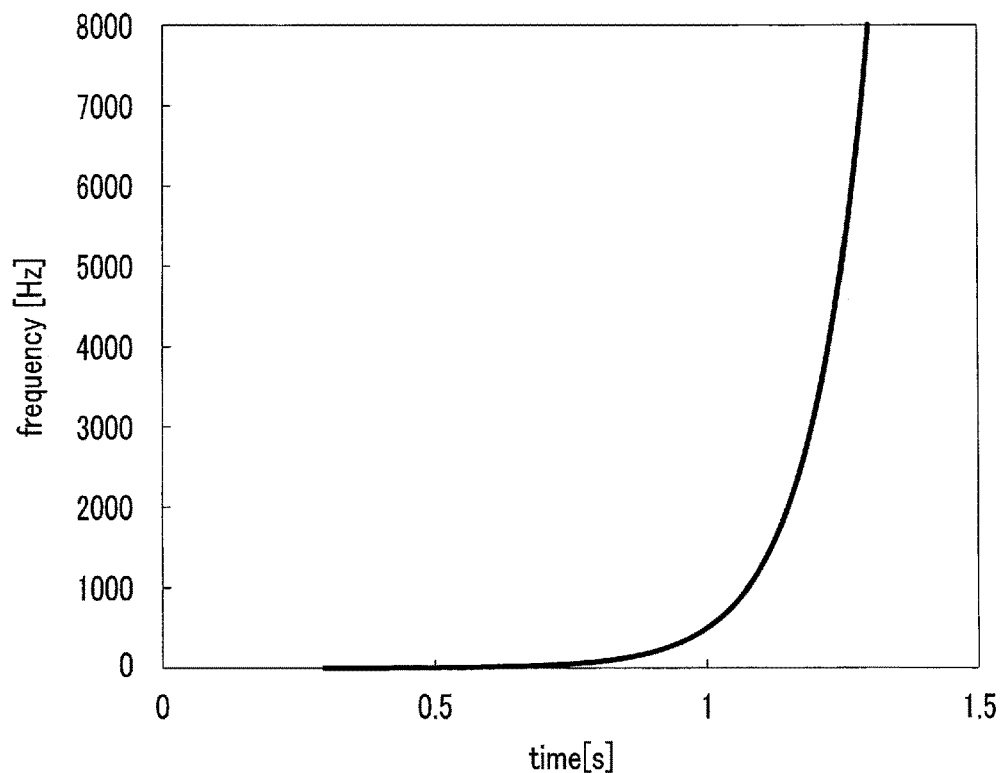
F I G. 23
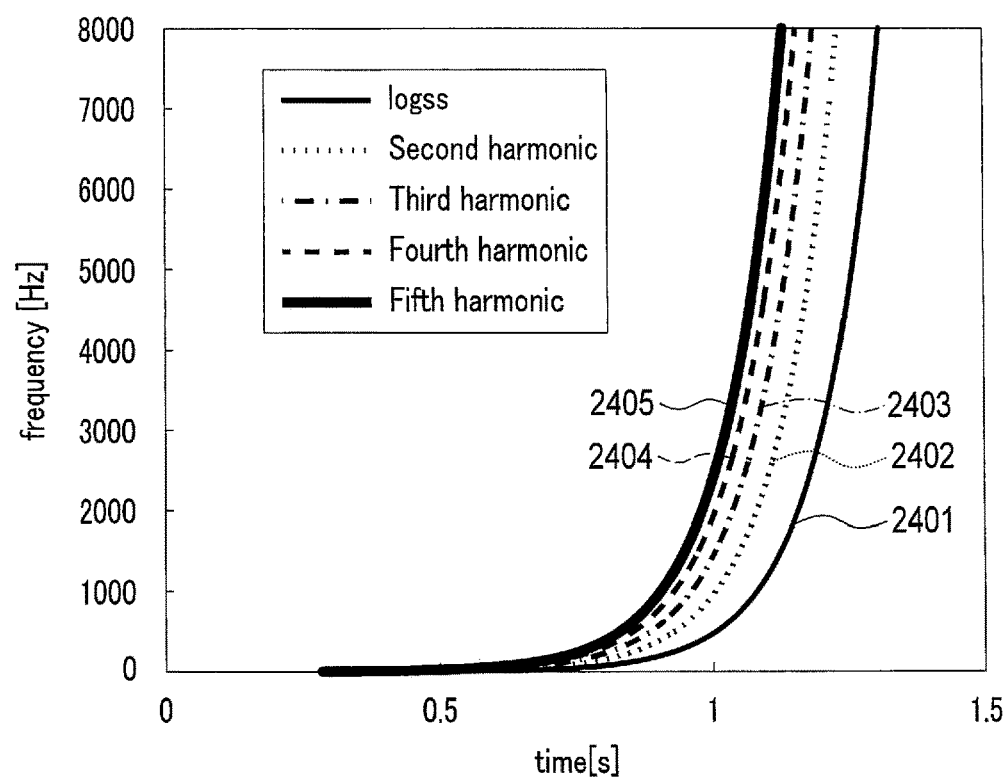
F I G. 24

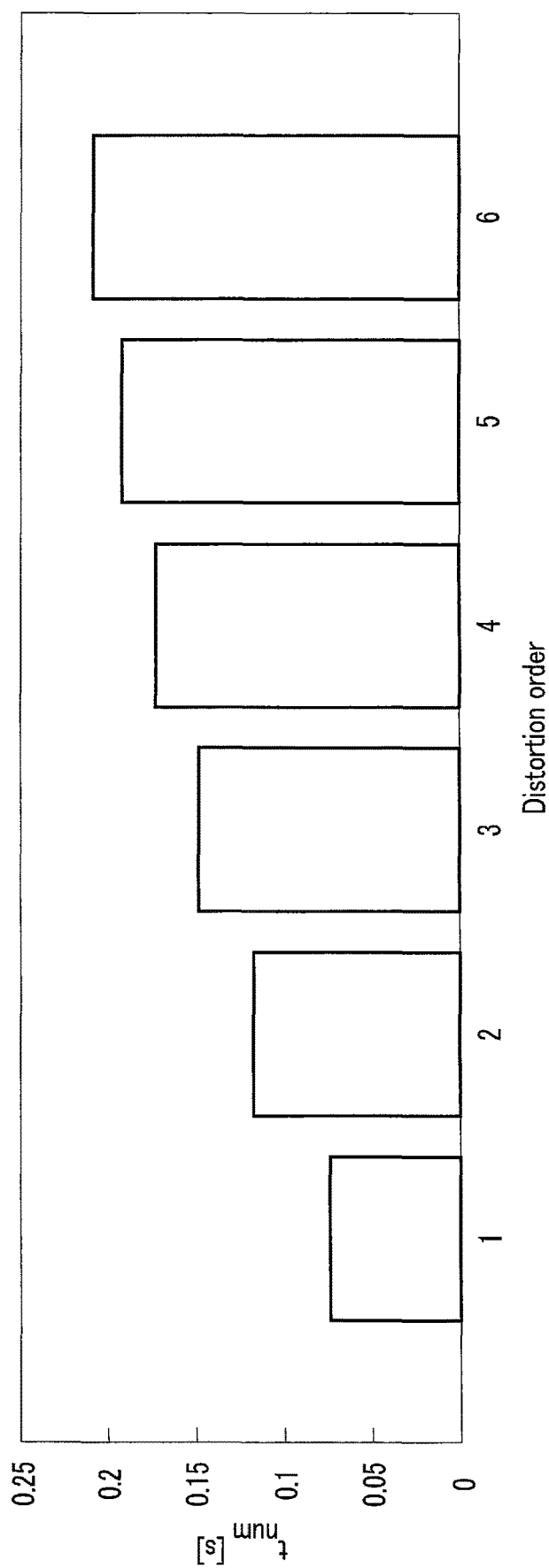
F I G. 26

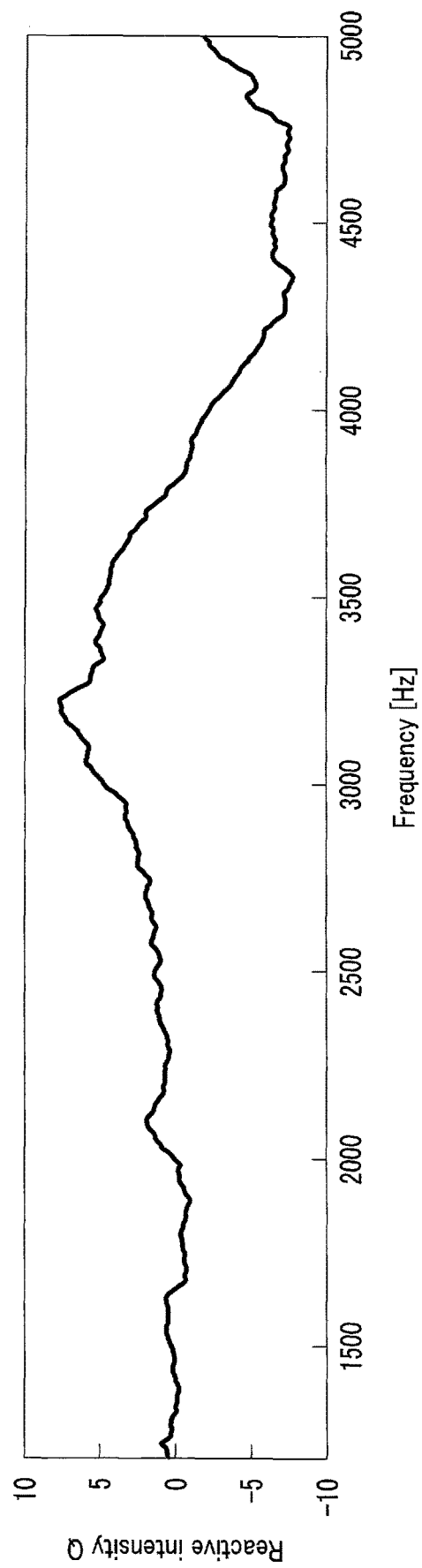
F I G. 31

DIAGNOSTIC APPARATUS AND DIAGNOSTIC METHOD

CROSS-REFERENCE TO RELATED APPLICATION

This application is based upon and claims the benefit of priority from Japanese Patent Application No. 2022-20743, filed Feb. 14, 2022, the entire contents of which are incorporated herein by reference.

FIELD

Embodiments described herein relate generally to a diagnostic apparatus and a diagnostic method.

BACKGROUND

In a structure such as a building or an infrastructure, various kinds of aged deterioration occur. Examples are a change in rigidity caused by welding of the structure or a change in welding conditions, a change in structure damping characteristic caused by peeling of an internal applied material in a damping material or the like, and a change in strength caused by rust, cracking, or cavitation of an internal structure. Therefore, periodical deterioration evaluation is performed by a hammering test or the like.

BRIEF DESCRIPTION OF THE DRAWINGS

FIG. 1 is a view showing a diagnostic apparatus according to an embodiment.

FIG. 2 is a view showing the diagnostic apparatus according to the embodiment.

FIG. 11 is a view showing ambient reflection.

FIG. 13 is a view showing a measure to reduce ambient reflection according to the embodiment.

FIG. 14 is a view showing a measure to reduce ambient reflection according to the embodiment.

FIG. 15 is a block diagram showing an example of the use of a phase shifter according to the embodiment.

FIG. 16 is a block diagram showing a phase shifter according to the embodiment.

FIG. 20 is a view showing a LOGSS signal.

FIG. 21 is a view showing a LOGSS signal obtained by shifting the LOGSS signal shown in FIG. 20.

FIG. 23 is a view showing the relationship between the time and the frequency in the spectrogram of the LOGSS signal.

FIG. 24 is a view showing a spectrogram when harmonic distortion occurs in the LOGSS signal having the spectrogram shown in FIG. 23.

FIG. 26 is a view showing the occurrence times of the distortion characteristics shown in FIG. 25.

FIG. 31 is a view showing the calculation result of reactive intensity according to the embodiment.

DETAILED DESCRIPTION

Figure 3:
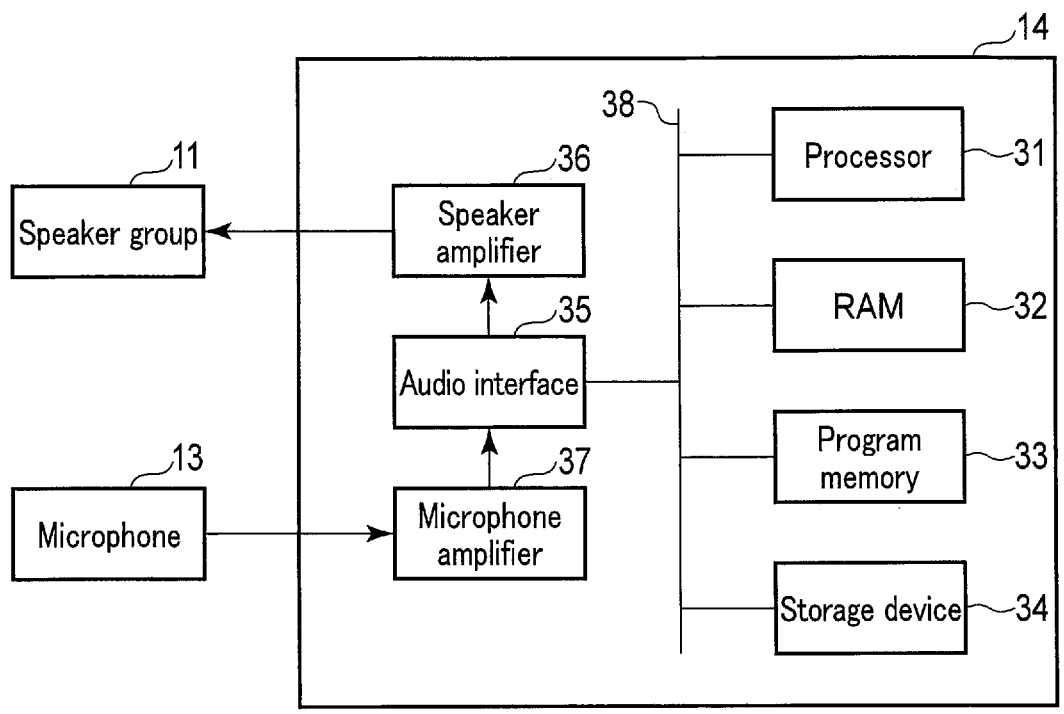
FIG. 3 is a block diagram showing the hardware configuration of a controller shown in FIG. 1.

According to an embodiment, a diagnostic apparatus includes a sound-emitting unit, at least one measurement unit, and a processor. The sound-emitting unit includes a plurality of speakers arranged at equal angular intervals on a circumference of a circle, and is configured to emit a first vibration sound to a target by using the speakers. The at least one measurement unit is arranged on a central axis of the circle, and is configured to measure a vibration of the target generated in response to the first vibration sound, or a second vibration sound radiated from the target due to the vibration. The processor is configured to diagnose the target based on an output from the at least one measurement unit.

Hereinafter, embodiments will be described with reference to the accompanying drawings. To omit repetitive explanation, the like reference numerals denote the like components throughout the drawings.

FIG. 1 schematically shows a configuration example of a diagnostic apparatus 10 according to an embodiment. As shown in FIG. 1, the diagnostic apparatus 10 includes a speaker group 11, a microphone 13 corresponding to a measuring unit, and a controller 14. The diagnostic apparatus 10 further includes a supporting part (not shown) configured to support the speaker group 11 and the microphone 13. The speaker group 11 is also called a sound-emitting unit.

The speaker group 11 includes a plurality of speakers 12 arranged at equal angular intervals on the circumference of a virtual circle, and emits a vibration sound to a structure 19 corresponding to a diagnostic target by using the speakers 12. The angular interval means an interval in the circumferential direction of the circle and is represented by an angle to the center of the circle. In this example shown in FIG. 1, the speaker group 11 includes four speakers 12 (speakers 12-1 to 12-4), and the four speakers 12 are arranged at an angular interval of π/2 [rad] on the circumference of the circle. In this specification, radian is used as the unit of an angle, and expression [rad] will be omitted hereinafter. Letting Lp be the number of the speakers 12, the angular interval is 2π/Lp. The vibration sound is used to vibrate the structure 19. The vibration sound to be emitted by the speaker group 11 will also be referred to as a control sound hereinafter.

During diagnosis, the speaker group 11 is pointed toward the structure 19. Specifically, the speaker group 11 is placed in a state in which a region of interest of the structure 19 is positioned on a central axis 18 of the circle. The central axis 18 of the circle is a virtual axis perpendicular to a virtual plane including the circle and passing the center of the circle. The structure 19 radiates a vibration sound in response to the control sound from the speaker group 11. Specifically, the structure 19 vibrates upon receiving the control sound from the speaker group 11, and radiates the vibration sound in accordance with this vibration.

The microphone 13 is arranged on the central axis 18 of the circle. In this example shown in FIG. 1, the microphone 13 is arranged between the speaker group 11 and the structure 19. The microphone 13 measures the vibration sound radiated from the structure 19 in response to the control sound from the speaker group 11. The microphone 13 converts the vibration sound from the structure 19 into an electrical signal, and outputs the electrical signal as a measurement signal. In this case, the measurement signal indicates a sound pressure of the vibration sound from the structure 19.

Note that it is also possible to use a vibration sensor such as a laser Doppler vibrometer (LDV) instead of the microphone 13. The LDV measures the vibration of the structure 19, which is induced by the control sound from the speaker group 11, and outputs a measurement signal indicating the vibration velocity.

The controller 14 controls the operation of the diagnostic apparatus 10. The controller 14 includes a driving unit 15 and a diagnostic unit 16. The driving unit 15 drives the speaker group 11. Specifically, the driving unit 15 generates a driving signal for driving the speaker group 11 based on a TSP (Time Stretched Pulse) signal, and outputs the driving signal to the speaker group 11. The driving signal may be a time-varying voltage signal. The TSP signal is also called a swept-sine signal. A LOGSS (Logarithmic Swept Sine) signal can be used as the TSP signal. The LOGSS signal is an example of the TSP signal, and is a sinewave signal whose frequency logarithmically increases or decreases with time. The use of the LOGSS signal enables evaluation of even a change in distortion characteristic such as "chattering vibration".

The diagnostic unit 16 diagnoses the structure 19 based on the output from the microphone 13. The diagnostic unit 16 includes an impulse response calculation unit 161 and an evaluation unit 162. The impulse response calculation unit 161 calculates an impulse response based on the measurement signal output from the microphone 13. The evaluation unit 162 evaluates the state (e.g., deterioration) of the structure 19 based on the calculation result of the impulse response.

The diagnostic apparatus 10 having the above-described configuration can diagnose the structure 19 with high reliability in a non-contact manner.

As shown in FIG. 2, the diagnostic apparatus 10 may include two microphones 13 (microphones 13-1 and 13-2).

The microphones 13 are arranged on the central axis 18 and spaced apart from each other at a predetermined distance. The diagnostic unit 16 diagnoses the structure 19 based on outputs from the microphones 13-1 and 13-2. In this example using the two microphones 13, the diagnostic unit 16 includes an impulse response calculation unit 161, an intensity calculation unit 163, and an evaluation unit 162. The impulse response calculation unit 161 calculates an impulse response based on a measurement signal output from the microphone 13-1, and calculates an impulse response based on a measurement signal output from the microphone 13-2. Based on these impulse response calculation results, the intensity calculation unit 163 calculates the intensity characteristic of the vibration sound radiated from the structure 19. The intensity characteristic includes at least one of active intensity indicating the flow of energy of a sound wave on an intensity measurement axis, or reactive intensity indicating a gradient of the square of sound pressure on the intensity measurement axis. That is, the intensity characteristic includes the active intensity, the reactive intensity, or both of them. The intensity measurement axis corresponds to the central axis 18. The evaluation unit 162 evaluates the state of the structure 19 based on the intensity characteristic calculation results.

FIG. 3 schematically shows a hardware configuration example of the controller 14. As shown in FIG. 3, the controller 14 includes a processor 31, a RAM (Random Access Memory) 32, a program memory 33, a storage device 34, an audio interface 35, a speaker amplifier 36, a microphone amplifier 37, and a bus 38. The processor 31 is connected to the RAM 32, the program memory 33, the storage device 34, and the audio interface 35 via the bus 38, and controls them.

The processor 31 includes a general-purpose circuit such as a CPU (Central Processing Unit). The RAM 32 is used as a working memory by the processor 31. The RAM 32 includes a volatile memory such as an SDRAM (Synchronous Dynamic RAM). The program memory 33 stores programs including a diagnostic program to be executed by the processor 31. Each program includes computer executable instructions. The program memory 33 may be a ROM (Read Only Memory). Alternatively, the storage device 34 may be used as the program memory 33. The storage device 34 includes a nonvolatile memory such as a flash memory.

The processor 31 loads a program stored in the program memory 33 onto the RAM 32, and interprets and executes the program. When executed by the processor 31, the diagnostic program causes the processor 31 to execute at least a part of processing to be explained in this embodiment. For example, the processor 31 functions as the diagnostic unit 16.

The diagnostic apparatus 10 can be provided with a program in a state in which it is stored in a computer-readable recording medium. In this case, the diagnostic apparatus 10 includes a drive for reading out data from the recording medium, and acquires the program from the recording medium. Examples of the recording medium are a magnetic disk, an optical disk (such as a CD-ROM, a CD-R, a DVD-ROM, or a DVD-R), a magneto-optical disk (such as an MO), and a semiconductor memory. A program may also be distributed across a network. Specifically, a program is stored in a server on a network, and the diagnostic apparatus 10 downloads the program from the server.

Note that the controller 14 may include a dedicated circuit instead of or in addition to the general-purpose circuit.

Examples of the dedicated circuit includes an ASIC (Application Specific Integrated Circuit) and an FPGA (Field Programmable Gate Array).

The audio interface 35 is an interface for the speaker group 11 and the microphone 13. The audio interface 35 includes a driving circuit for generating a driving signal for driving the speaker group 11 (a plurality of driving signals for driving the plurality of speakers 12). The speaker amplifier 36 amplifies the driving signal and outputs the signal to the speaker group 11. The driving unit 15 shown in FIG. 1 may be implemented by a combination of the processor 31, the audio interface 35, and the speaker amplifier 36.

The measurement signal output from the microphone 13 is supplied to the processor 31 via the microphone amplifier 37 and the audio interface 35. The microphone amplifier 37 amplifies the measurement signal, and the audio interface 35 performs analog-to-digital conversion on the measurement signal.

The diagnostic apparatus 10 will be explained in detail below.

Figure 4:
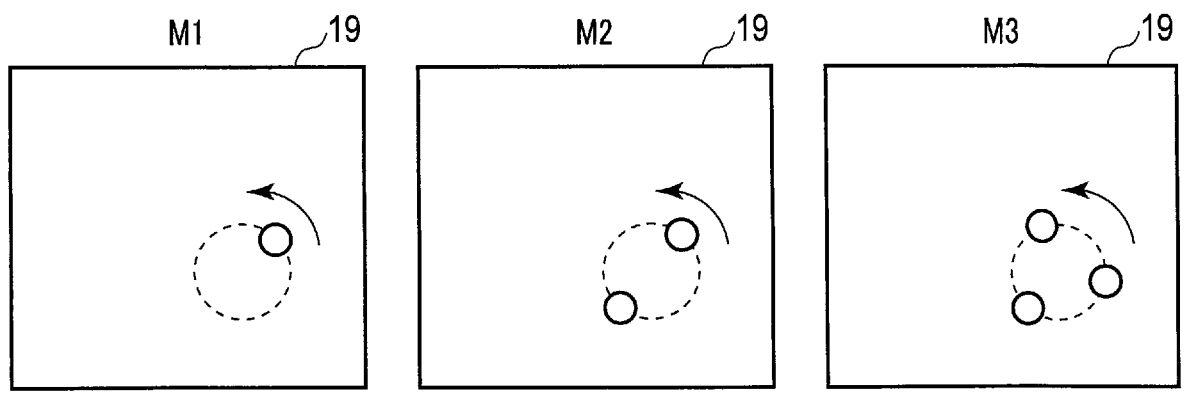
FIG. 4 is a view for explaining Lobe-mode vibration sounds according to the embodiment.

The driving unit 15 drives the speakers 12 so that the speaker group 11 emits a control sound in a Lobe mode. The sound in the Lobe mode, which is also called the Lobe-mode sound, is a sound having a phase change on the circumference. Specifically, the Lobe-mode sound is a rotational sound by which a point where the sound pressure is maximum moves along the circumference. As shown in FIG. 4, applying the Lobe-mode control sound to the structure 19 is equivalent to continuously applying a vibration (blow) to the structure 19 along the circle. In FIG. 4, each point shown on the circumference indicates a position to which the vibration is applied. The vibration is applied to one point in a first-order Lobe mode (M1), simultaneously applied to two points in a second-order Lobe mode (M2), and simultaneously applied to three points in a third-order Lobe mode (M3). In an Mth-order Lobe mode, the vibration is simultaneously applied to M points, and as a consequence the vibration is applied to each point on the circumference M times during a time length (1/f [s]) corresponding to one wavelength, where f is the frequency of the driving signal. The characteristic of the vibration sound from the structure 19 depends on the order of the Lobe mode. Therefore, the use of a plurality of Lobe modes is effective to diagnose the state of the structure 19.

To emit the Lobe-mode control sound, a predetermined phase difference is set between the speakers 12. The predetermined phase difference depends on the angular interval ($2\pi/Lp$) between the speakers 12 and the order of the Lobe mode. For example, a phase difference of $2\pi M/Lp$ is set between two speakers adjacent to each other on the circumference of the circle, where M represents the order of the Lobe mode. When the speaker group 11 emits an Mth-order-Lobe-mode control sound, 2M+1 or more speakers 12 are used.

Figure 5:
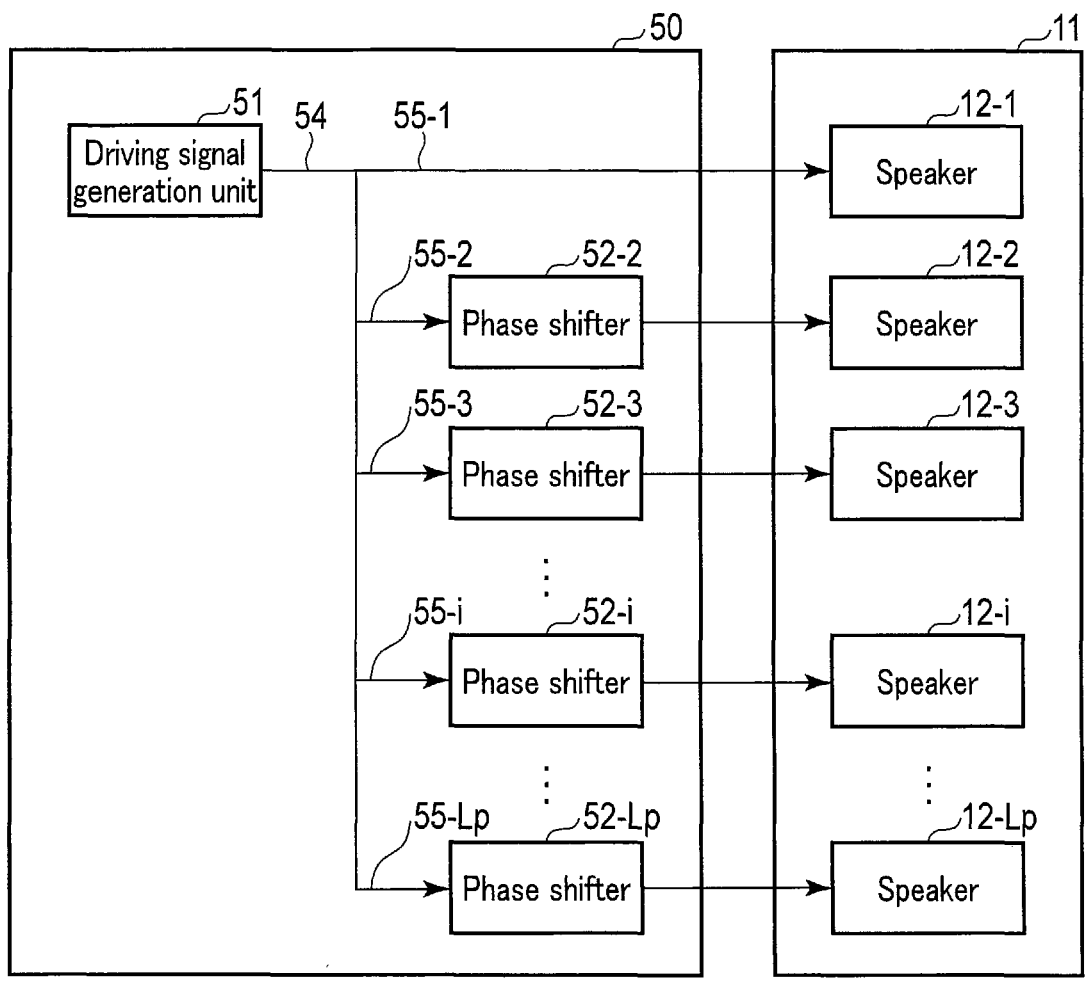
FIG. 5 is a block diagram showing a driving unit shown in FIG. 1.

FIG. 5 schematically shows a driving circuit 50 as an example of the driving circuit for implementing the driving unit 15. As shown in FIG. 5, the driving circuit 50 drives Lp speakers 12-1 to 12-Lp. The driving circuit 50 includes a driving signal generation unit 51 and Lp−1 phase shifters 52 (phase shifters 52-2 to 52-Lp). The phase shifters 52-2 to 52-Lp are respectively connected to the speakers 12-2 to 12-Lp.

The driving signal generation unit 51 generates a driving signal 54 based on a TSP signal. The driving signal 54 is branched into driving signals 55-1 to 55-Lp. The driving signal 55-1 is directly applied to the speaker 12-1, and the speaker 12-1 converts the driving signal 55-1 into a sound.

The driving signal 55-$i$ is supplied to the phase shifter 52-$i$. The phase shifter 52-$i$ applies a phase shift of $-(2\pi/Lp\times(i-1))\times M$ to the driving signal 55-$i$. The phase shifter 52-$i$ delays the driving signal 55-$i$ by a phase of $(2\pi/Lp\times(i-1))\times M$. The phase-shifted driving signal 55-$i$ is applied to the speaker 12-$i$, and the speaker 12-$i$ converts the phase-shifted driving signal 55-$i$ into a sound. Accordingly, the speaker group 11 emits an Mth-order-Lobe-mode control sound.

When the speaker group 11 emits a Lobe-mode control sound, the sound pressure of the control sound is in principle zero on the central axis 18. The following equations reveal that the sound pressure is zero on the central axis 18:

$$\sum_{i=1}^{L_p}\left\{q_{si}\left(\frac{e^{-jkr}}{4\pi r}\right)\right\} = \left(\frac{e^{-jkr}}{4\pi r}\right)Q\sum_{i=1}^{L_p}e^{-jM\phi_i} = 0$$

$$\phi_i = \frac{2\pi(i-1)}{L_p}$$

where r is the distance between each speaker 12 and the microphone 13, $q_{si}$ is the volume velocity of each speaker 12, Q is the sound volume of each speaker 12, k is the wavenumber, and j is an imaginary number. Assume that all the speakers 12 are set at the same sound volume.

Figure 6:
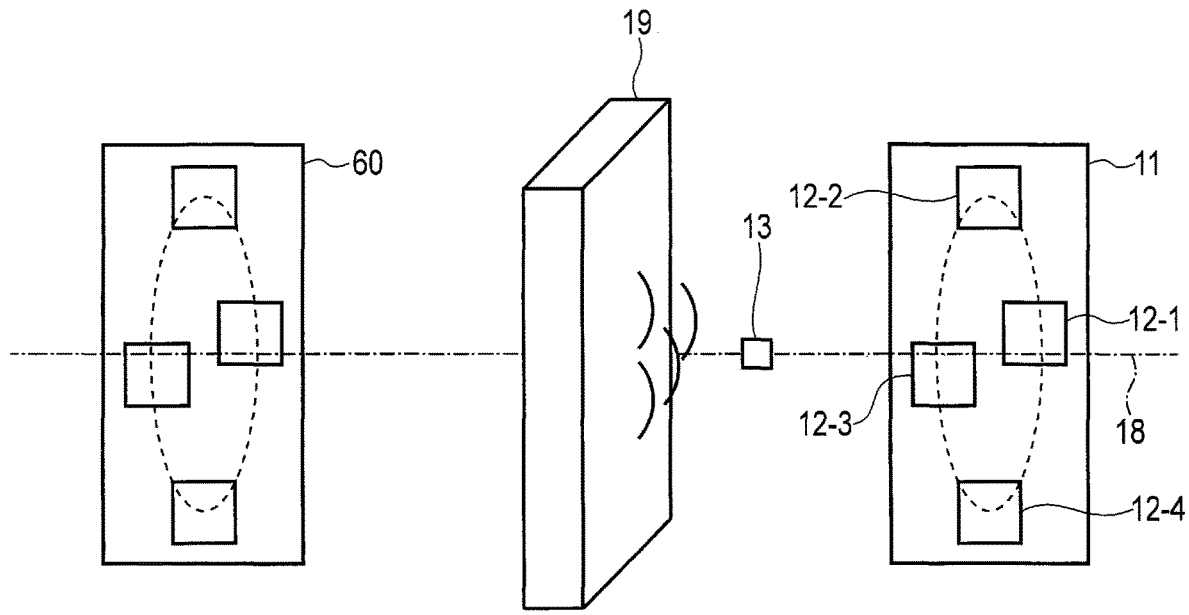
FIG. 6 is a view for explaining why the sound pressure of a vibration sound emitted from a speaker group and reflected by a structure is zero on a central axis.

The control sound emitted by the speaker group 11 is reflected by the structure 19. The sound pressure of the control sound reflected by the structure 19 is zero on the central axis 18. Specifically, as shown in FIG. 6, the reflected control sound is equivalent to a vibration sound emitted by a mirror image sound source 60 corresponding to a mirror image of the speaker group 11, and is in principle zero on the central axis 18 for the same reason as described above.

In practice, the sound pressure on the central axis 18 is not zero due to the reflection characteristics of the environment and the structure 19. However, the control sound from the speaker group 11 and its reflected sound are effectively suppressed on the central axis 18.

Accordingly, the microphone 13 can efficiently measure the vibration sound radiated from the structure 19. This leads to saving on computing resources. For example, this obviates the need for a process of removing components of the control sound emitted from the speaker group 11 from the output of the microphone 13.

As indicated by the arrangement example shown in FIG. 1, it is most efficient to arrange the speakers 12 at an angular interval of $2\pi/Lp$ on the circumference of the circle. However, it is sometimes impossible to arrange the speakers 12 at an angular interval of $2\pi/Lp$ due to the limitation on arrangement. In this case, the speakers 12 may be arranged by shifting the angular interval, and the phase difference between the speakers 12 is still set at $2\pi M/Lp$. For example, when the arrangement space is only a semicircle, the speakers 12 may be arranged at an angular interval of $\pi/Lp$ on the circumference of the semicircle. The sound pressure of the control sound is in principle zero on the central axis 18 in this case as well. However, no rotational sound source characteristic can be obtained.

As described above, 2M+1 or more speakers 12 are used when the speaker group 11 emits the Mth-order-Lobe-mode control sound. Accordingly, at least three speakers 12 are provided. Note that the number of speakers may be 2. Specifically, it is possible to adopt a dipole sound source configuration in which two speakers 12 are aligned and driven by a reverse phase. In other words, two speakers 12 are arranged at an angular interval of π on the circumference of the circle, and a phase difference of π is set between the two speakers 12. Even in this dipole sound source configuration, the sound pressure is in principle zero on the central axis 18 (a line segment that orthogonally intersects a line segment connecting the two speakers 12 and passes the center of the two speakers 12). Therefore, the microphone 13 can efficiently measure the vibration sound radiated from the structure 19. However, no rotational sound source characteristic can be obtained.

Figure 7:
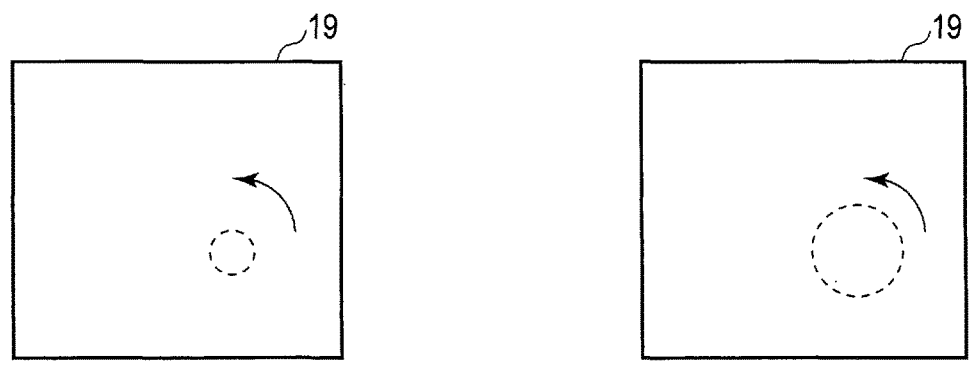
FIG. 7 is a view showing the relationship between the radius of a circle in which speakers are arranged and the size of a region to which the vibration sound emitted from the speaker group is applied.

The size of a region (to be referred to as a target region) of the structure 19 to which the control sound emitted from the speaker group 11 is applied depends on the radius of a circle on which the speakers 12 are arranged. As shown in FIG. 7, when the radius is small, the target region of the structure 19 is small, so a state change of a local region of the structure 19 can be observed. On the other hand, when the radius is large, the target region of the structure 19 is large, so an average state change of the large region can be observed.

Figure 8:
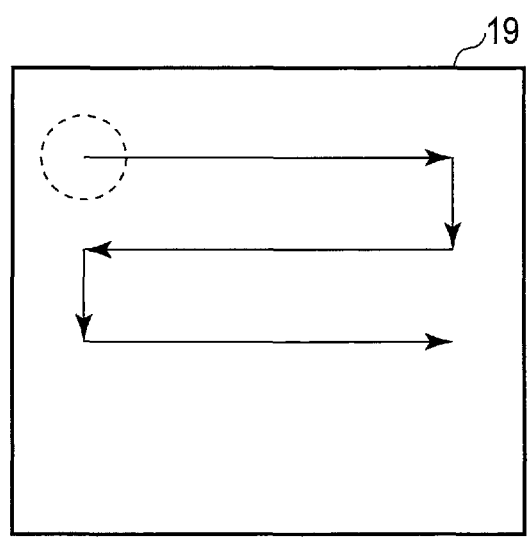
FIG. 8 is a view for explaining a method of diagnosing the whole region of a structure according to the embodiment.

The entire region of the structure 19 is observed by moving the diagnostic apparatus 10. For example, the diagnostic apparatus 10 traverses the structure 19 as shown in FIG. 8. The diagnostic apparatus 10 can be moved either manually or mechanically.

When the radius of the circle on which the speakers 12 are arranged is decreased, the target region narrows and the spatial resolution increases, but the traverse time prolongs. By contrast, when the radius is increased, the target region widens and the spatial resolution decreases, but the traverse time shortens.

The supporting part can include a mechanism capable of changing the radius of the circle on which the speakers 12 are arranged and/or a mechanism capable of changing the distance between the speaker group 11 and the microphone 13. The supporting part may also include a mechanism capable of changing the angle between the speakers 12, so that the angle between the speakers 12 to be used from among other speakers 12 can be changed.

Figure 9:
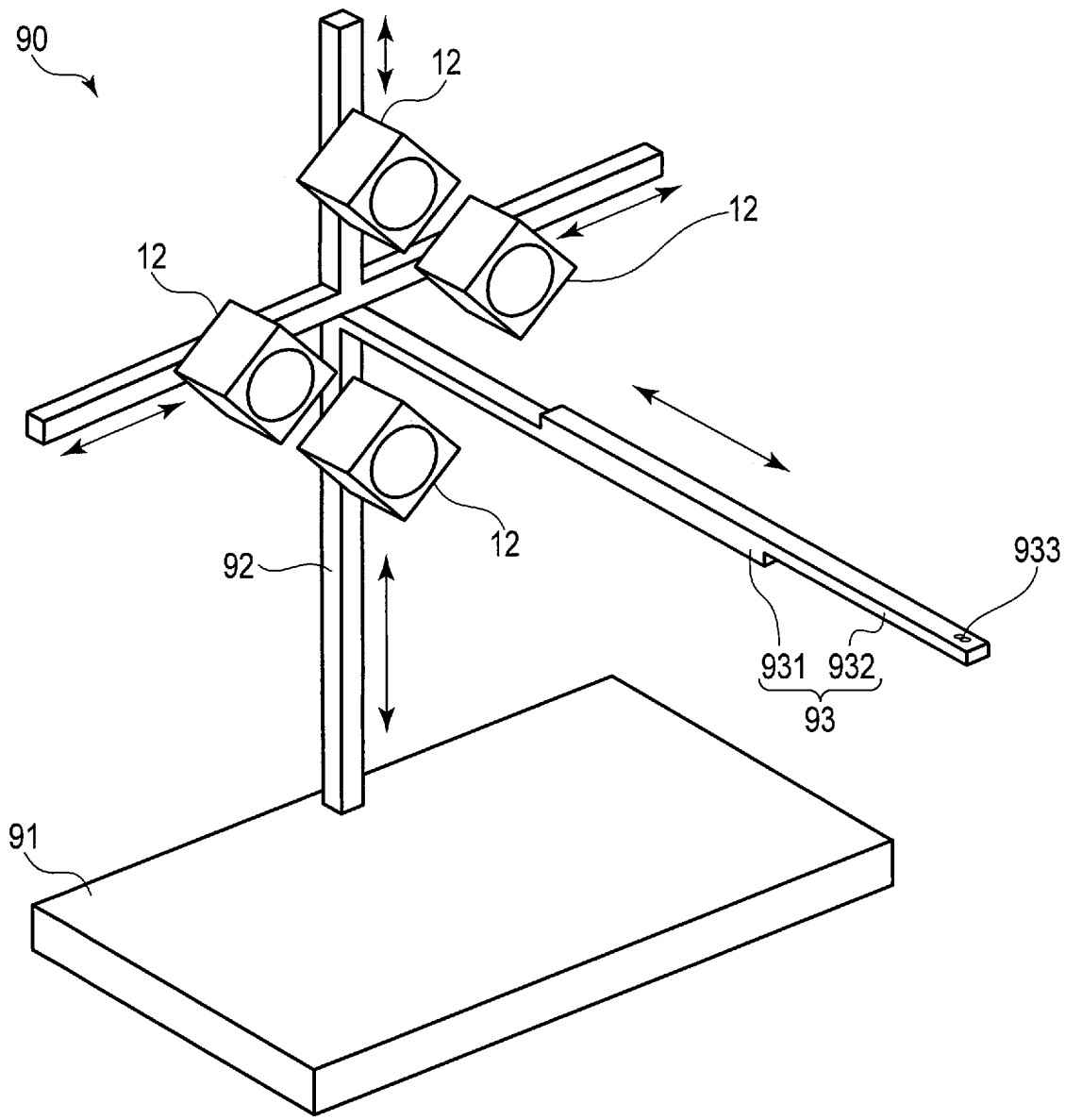
FIG. 9 is a view showing a supporting part according to the embodiment.

FIG. 9 schematically shows a supporting part 90 as an example of the supporting part according to the embodiment. The supporting part 90 shown in FIG. 9 is used when moving the diagnostic apparatus 10 by using a machine. The supporting part 90 includes a pedestal 91 and supporting members 92 and 93. The pedestal 91 is attached to the machine that moves the diagnostic apparatus 10. The supporting member 92 is attached to the pedestal 91, and supports the speakers 12 such that the speakers 12 move in the radial direction of the circle. Moving the speakers 12 in the radial direction of the circle changes the radius of the circle on which the speakers 12 are arranged. In an example in which the speaker group 11 includes four speakers 12, the supporting member 92 has a cross shape. The speakers 12 may be moved manually. Alternatively, the supporting part 90 can further include a moving mechanism (not shown) for moving the speakers 12 in the radial direction of the circle. The supporting member 93 is attached to the supporting member 92, and supports the microphone 13 such that the microphone 13 moves along the central axis 18. For example, the supporting member 93 includes a supporting member 931 attached to the supporting member 92, and a supporting member 932 slidably connected to the supporting member 931. The microphone 13 is attached to a distal end 933 of the supporting member 932. Sliding the supporting member 932 with respect to the supporting member 931 changes the distance between the speaker group 11 and the microphone 13.

Figure 10:
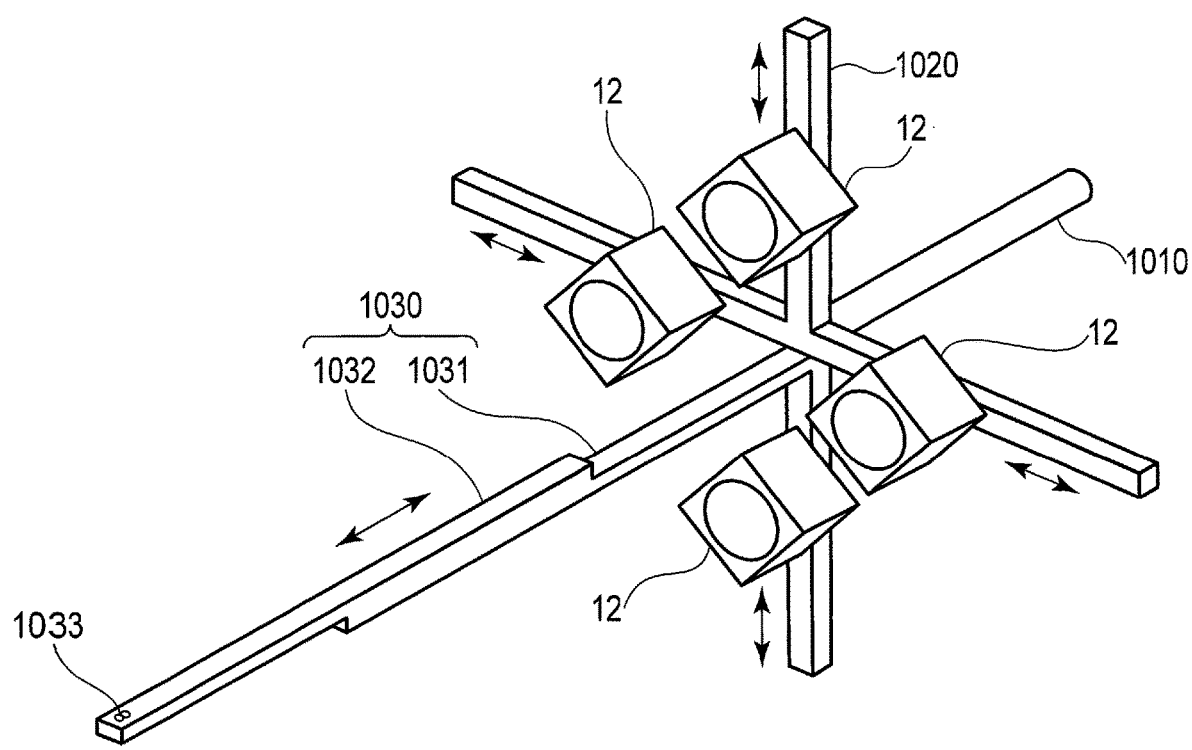
FIG. 10 is a view showing a supporting part according to the embodiment.

FIG. 10 schematically shows a supporting part 1000 as another example of the supporting part according to the embodiment. The supporting part 1000 shown in FIG. 10 is used when manually moving the diagnostic apparatus 10. The supporting part 1000 includes a member 1010 and supporting members 1020 and 1030. The member 1010 is a grip to be held by the hand of an operator. The supporting member 1020 is attached to the member 1010, and supports the speakers 12 such that the speakers 12 move in the radial direction of the circle. In an example in which the speaker group 11 includes four speakers 12, the supporting member 1020 has a cross shape. The supporting member 1030 is attached to the supporting member 1020, and supports the microphone 13 such that the microphone 13 move along the central axis 18. For example, the supporting member 1030 includes a supporting member 1031 attached to the supporting member 1020, and a supporting member 1032 slidably connected to the supporting member 1031. The microphone 13 is attached to a distal end 1033 of the supporting member 1032.

Measures to reduce the influence of ambient reflection will be explained below.

FIG. 11 schematically shows a situation in which floor surface reflection as an example of ambient reflection occurs. As shown in FIG. 11, a control sound from the speaker group 11 is reflected by a floor surface 1101, and the microphone 13 detects the reflected control sound. A simple measure to reduce the influence of the floor surface reflection is to install an acoustic absorption material on the floor surface 1101. However, another measure is necessary when the contribution of reflection caused by a wall surface or the like is high.

Figure 12:
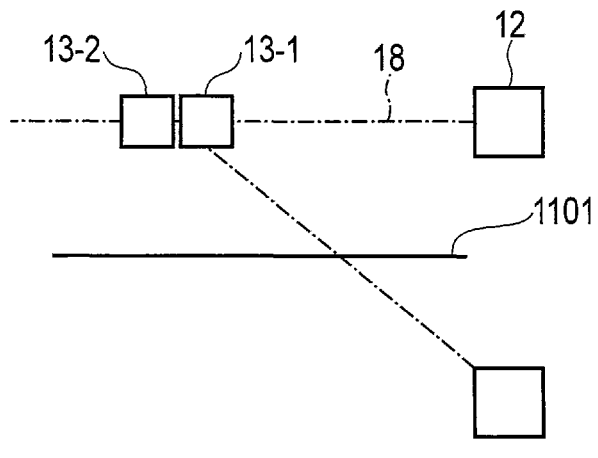
FIG. 12 is a view showing a measure to reduce ambient reflection according to the embodiment.
Figure 12:
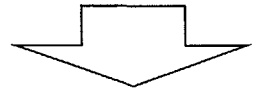
Figure 12:
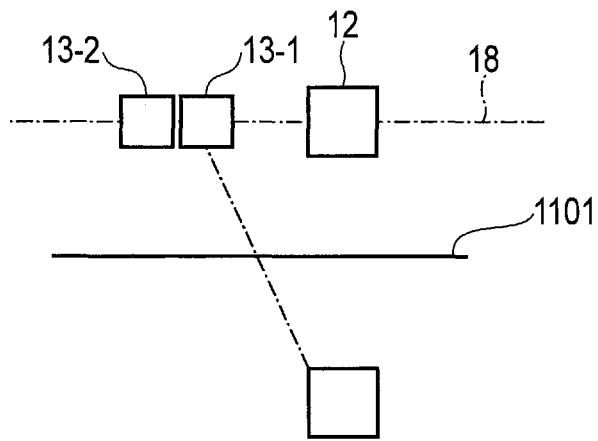

In an example in which two microphones 13 are provided, the influence of ambient reflection can be reduced by decreasing the distance between the speaker group 11 and the microphones 13. When the distance between the speaker group 11 and the microphones 13 is small, as shown in FIG. 12, the angle the central axis 18 makes with the direction of arrival of the reflected control sound increases, and this decreases the influence of ambient reflection on the intensity characteristic.

Another measure is to use a directional microphone as the microphone 13 and point the direction of the microphone to the structure 19.

Still another measure is to increase the directivity of the speaker group 11. As shown in FIG. 13, an example of the method of increasing the directivity of the speaker group 11 is to install the speakers 12 on the outer surface of or inside a cylindrical member 1301.

As shown in FIG. 14, a further measure is to install a reflection blocking plate 1401 between the speaker group 11 and the microphone 13. The reflection blocking plate 1401 is a plate member having a circular through hole 1402. The reflection blocking plate 1401 is so set that the center of the through hole 1402 is positioned on the central axis 18. The radius of the through hole 1402 of the reflection blocking plate 1401 is larger than that of the circle on which the speakers 12 are arranged. The reflection blocking plate 1401 passes the control sound from the speaker group 11, and blocks the control sound reflected by the floor surface or the like from arriving at the microphone 13.

A phase shifter will be explained below.

A $\pi/2$ phase shifter for delaying a signal by a phase of $\pi/2$ is also called a Hilbert transformer, and may be implemented by using the following FIR coefficient of an FIR filter:

$$g(i) = \frac{\sin^2\left(\pi\left(i - \frac{Lf}{2}\right)/2\right)}{\pi\left(i - \frac{Lf}{2}\right)/2}$$

$$g\left(\frac{Lf}{2}\right) = 0$$

where g(i) is the ith coefficient, and Lf is the filter length.

The Hilbert transformer using the FIR filter includes a delay of Lf/2Fs sec, where Fs is the sampling frequency.

FIG. 15 schematically shows an example of the use of the π/2 phase shifter using the Hilbert transformer. A circuit 1500 shown in FIG. 15 includes a delay unit 1501 and a π/2 phase shifter 1502. A signal u is bifurcated and supplied to the delay unit 1501 and the π/2 phase shifter 1502. The π/2 phase shifter 1502 applies a phase shift of −π/2 to the signal u, thereby generating a signal u2. The delay unit 1501 delays the signal u by the delay time produced by the π/2 phase shifter 1502, thereby generating a signal u1. The delay unit 1501 can be implemented by using an FIR filter having filter coefficient h(Lf/2)=1. The phase difference between the signals u1 and u2 is π/2 regardless of the frequency.

A phase shifter for applying a phase shift other than π/2 can be implemented by the synthesis of trigonometric functions by using the Hilbert transformer.

FIG. 16 schematically shows a phase shifter 1600 that applies a phase shift B to a signal. As shown in FIG. 16, the phase shifter 1600 includes a delay unit 1601, a π/2 phase shifter 1602, an amplifier 1603, an element 1604, and an amplifier 1605. The element 1604 is an adder when 0<θ<π/2 or 3π/2<θ<2π, and is a subtracter when π/2<θ<π or π<θ<3π/2.

The signal u is bifurcated and supplied to the delay unit 1601 and the π/2 phase shifter 1602. The delay unit 1601 delays the signal u by a delay time produced by the π/2 phase shifter 1602. The amplifier 1603 amplifies the output signal from the π/2 phase shifter 1602. The amplifier 1603 has a gain of tan θ when 0<θ<π/2 or 3π/2<θ<2π, and has a gain of − tan θ when π/2<θ<π or π<θ<3π/2. The element 1604 adds the signal u1 to the output signal from the amplifier 1603 when 0<θ<π/2 or 3π/2<θ<2π, and subtracts the signal u1 from the output signal from the amplifier 1603 when π/2<θ<π or π<θ<3π/2. The amplifier 1605 amplifies the output signal from the element 1604. The amplifier 1605 has a gain of $1/\sqrt{1+\tan^2\theta}$. The phase difference between the output signal u1 from the delay unit 1601 and the output signal u2 from the amplifier 1605 is θ regardless of the frequency.

$$0 < \theta < \frac{\pi}{2} \text{ or } \frac{3\pi}{2} < \theta < 2\pi$$

$$j(i) = (h(i) + amp1 \times g(i)) \times amp2$$

$$amp1 = \tan\theta$$

$$amp2 = \frac{1}{\sqrt{1 + amp1^2}}$$

$$\frac{\pi}{2} < \theta < \pi \text{ or } \pi < \theta < \frac{3\pi}{2}$$

-continued $$j(i) = (-h(i) + amp1 \times g(i)) \times amp2$$

$$amp1 = -\tan\theta$$

$$amp2 = \frac{1}{\sqrt{1 + amp1^2}}$$

In an arbitrary phase shift, a delay error at a low frequency occurs depending on the filter length Lf. Since this delay error can be normalized by Lf/Fs, when Lf/Fs=512/10000 is set, for example, the delay error is π/180 or less in a frequency band of 200 Hz or more. The filter length Lf is set in accordance with the use frequency band and the sampling frequency.

Figure 17:
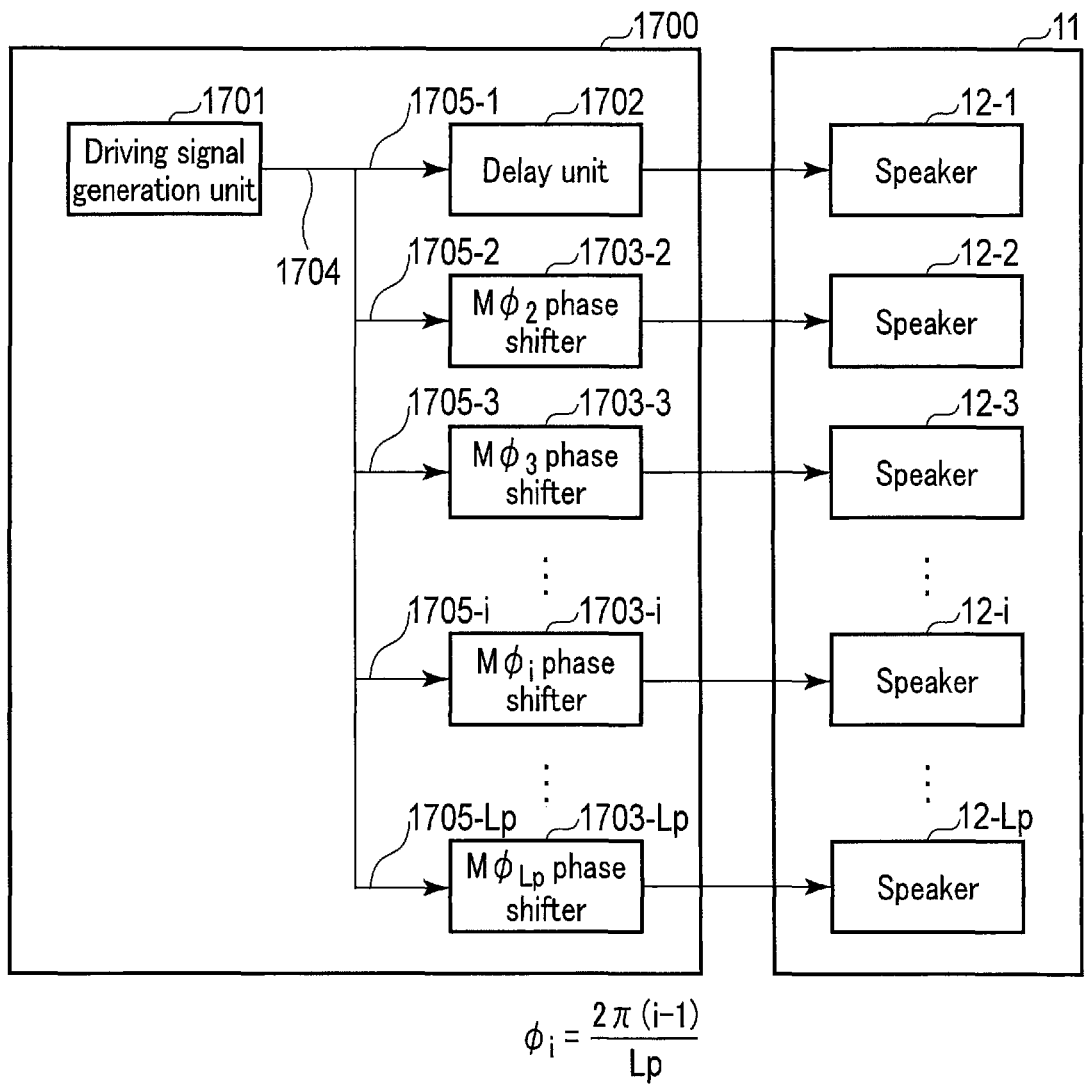
FIG. 17 is a block diagram showing a driving circuit according to the embodiment.

FIG. 17 schematically shows a driving circuit 1700 as an example of the driving circuit including the phase shifter using the Hilbert transformer. As shown in FIG. 17, the driving circuit 1700 drives Lp speakers 12-1 to 12-Lp. The driving circuit 1700 includes a driving signal generation unit 1701, a delay unit 1702, and Lp-1 phase shifters 1703 (phase shifters 1703-2 to 1703-Lp). The delay unit 1702 is connected to the speaker 12-1, and the phase shifters 1703-2 to 1703-Lp are respectively connected to the speakers 12-2 to 12-Lp.

The driving signal generation unit 1701 generates a driving signal 1704 based on the TSP signal. The driving signal 1704 is branched into driving signals 1705-1 to 1705-Lp. The driving signal 1705-1 is supplied to the delay unit 1702. The delay unit 1702 delays the driving signal 1705-1 by a delay time produced by the phase shifters 1703-2 to 1703-Lp to generate a driving signal u1, and applies the driving signal u1 to the speaker 12-1. The driving signal 1705-i is supplied to the phase shifter 1703-i. The phase shifter 1703-i applies a phase shift of −(2π/Lp×(i−1))×M to the driving signal 1705-i to generate a driving signal ui, and applies the driving signal ui to the speaker 12-i.

As described earlier, 2M+1 or more speakers 12 are used when emitting an Mth-order-Lobe-mode vibration sound. The number of phase shifters can be reduced when the number Lp of speakers has a specific relationship with the order M of the Lobe mode, such as when Lp=4M (4M arrangement) or Lp=3M (3M arrangement).

In the 4M arrangement, phase shifts to be applied are 0, π/2, π, and 3π/2, the Lobe mode can be driven by using one phase shifter.

An example in which the speaker group 11 includes twelve speakers 12 (speakers 12-1 to 12-12), and a third-order-Lobe-mode vibration sound is emitted by using the twelve speakers 12 will be explained. The twelve speakers 12 are arranged at an angular interval of π/6. A phase shift for the speaker 12-i is −Mϕ$_i$, and ϕ$_i$=2π(i−1)/Lp. That is, a phase shift for each of the speakers 12-1, 12-5, and 12-9 is 0, a phase shift for each of the speakers 12-2, 12-6, and 12-10 is −π/2, a phase shift for each of the speakers 12-3, 12-7, and 12-11 is −π, and a phase shift for each of the speakers 12-4, 12-8, and 12-12 is −3π/2.

Figure 18:
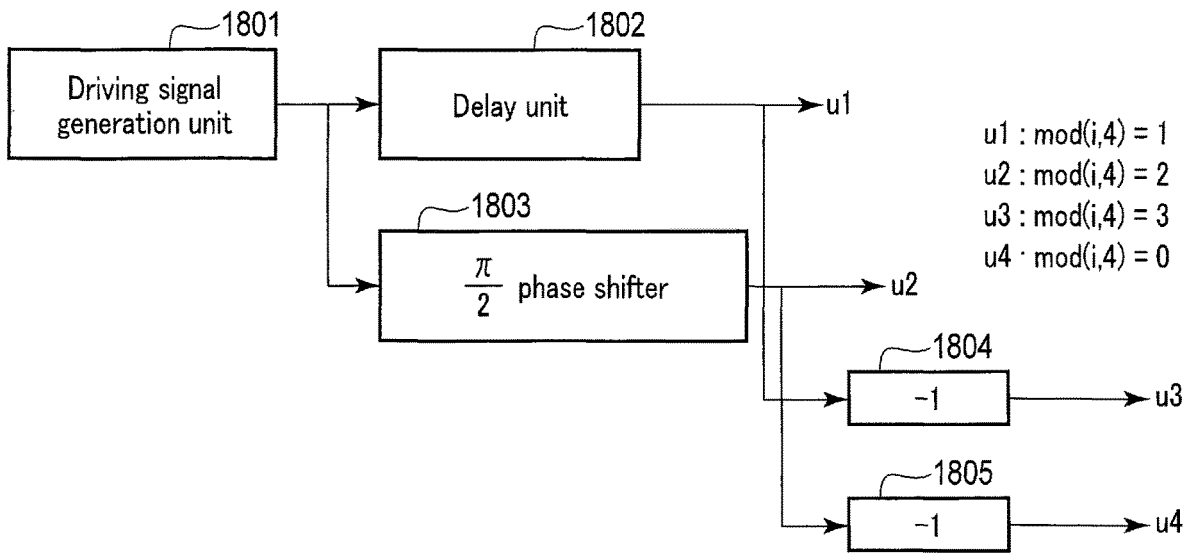
FIG. 18 is a block diagram showing a driving circuit according to the embodiment.

FIG. 18 schematically shows a driving circuit 1800 as an example of the driving circuit for use in the 4M arrangement. As shown in FIG. 18, the driving circuit 1800 incudes a driving signal generation unit 1801, a delay unit 1802, a π/2 phase shifter 1803, and inverting circuits 1804 and 1805. The π/2 phase shifter 1803 is a phase shifter using the Hilbert transformer, and includes a delay of Lf/2Fs sec.

A driving signal u output from the driving signal generation unit 1801 is bifurcated and supplied to the delay unit 1802 and the π/2 phase shifter 1803. The delay unit 1802 delays the driving signal u by Lf/2Fs sec. The output from the delay unit 1802 is bifurcated, one is directly output as a driving signal u1, and the other is supplied to the inverting circuit 1804. The inverting circuit 1804 generates a driving signal u3 by inverting the driving signal from the delay unit 1802. The π/2 phase shifter 1803 applies a phase shift of −π/2 to the driving signal u. The output from the π/2 phase shifter 1803 is bifurcated, one is directly output as a driving signal u2, and the other is supplied to the inverting circuit 1805. The inverting circuit 1805 generates a driving signal u4 by inverting the driving signal from the π/2 phase shifter 1803.

The driving signal u1 is supplied to the speaker 12-$i$ (i satisfies mod(i,4)=1). Specifically, the driving signal u1 is trifurcated and supplied to the speakers 12-1, 12-5, and 12-9. The driving signal u2 is supplied to the speaker 12-$i$ (i satisfies mod(i,4)=2). Specifically, the driving signal u2 is trifurcated and supplied to the speakers 12-2, 12-6, and 12-10. The driving signal u3 is supplied to the speaker 12-$i$ (i satisfies mod(i,4)=3). Specifically, the driving signal u3 is trifurcated and supplied to the speakers 12-3, 12-7, and 12-11. The driving signal u4 is supplied to the speaker 12-$i$ (i satisfies mod(i,4)=4). Specifically, the driving signal u4 is trifurcated and supplied to the speakers 12-4, 12-8, and 12-12.

In the 3M arrangement, phase shifts to be applied are 0, 2π/3, and 4π/3, so the Lobe mode can be driven by using two phase shifters.

An example in which the speaker group 11 emits a fourth-order-Lobe-mode vibration sound by using twelve speakers 12 (speakers 12-1 to 12-12) will be explained. The twelve speakers 12 are arranged at an angular interval of π/6. A phase shift for the speaker 12-$i$ is −Mϕ$_i$, and ϕ$_i$=2π(i−1)/Lp. That is, a phase shift for each of the speakers 12-1, 12-4, 12-7, and 12-10 is 0, a phase shift for each of the speakers 12-2, 12-5, 12-8, and 12-11 is −2π/3, and a phase shift for each of the speakers 12-3, 12-6, 12-9, and 12-12 is −4π/3.

Figure 19:
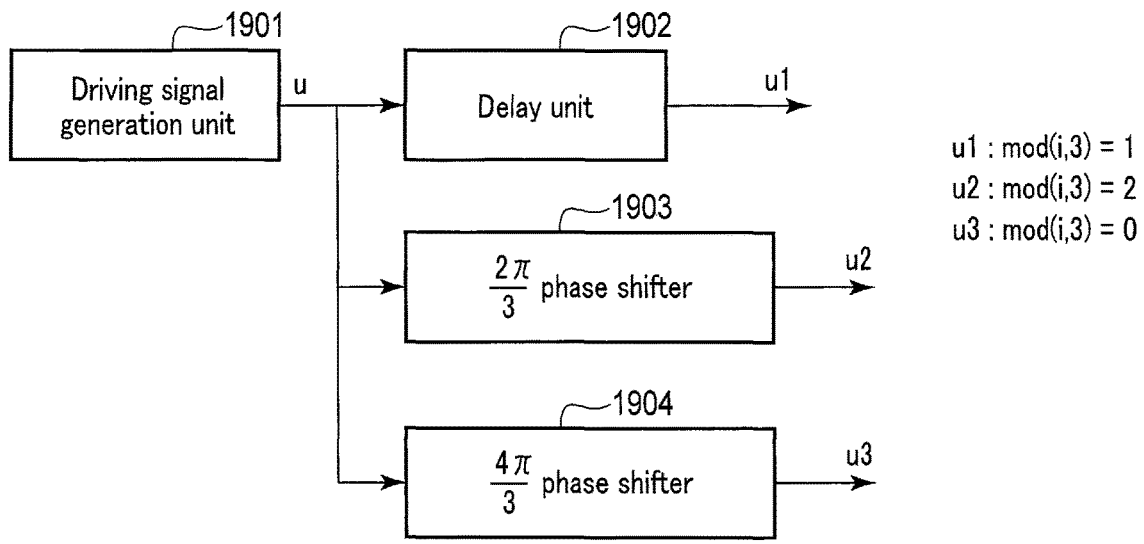
FIG. 19 is a block diagram showing a driving circuit according to the embodiment.

FIG. 19 schematically shows a driving circuit 1900 as an example of the driving circuit for use in the 3M arrangement. As shown in FIG. 19, the driving circuit 1900 includes a driving signal generation unit 1901, a delay unit 1902, a 2π/3 phase shifter 1903, and a 4π/3 phase shifter 1904. Each of the 2π/3 phase shifter 1903 and the 4π/3 phase shifter 1904 is a phase shifter using the Hilbert transformer, and includes a delay of Lf/2Fs sec.

A driving signal u output from the driving signal generation unit 1901 is supplied to the delay unit 1902, the 2π/3 phase shifter 1903, and the 4π/3 phase shifter 1904. The delay unit 1902 generates a driving signal u1 by delaying the driving signal u by Lf/2Fs sec. The 2π/3 phase shifter 1903 generates a driving signal u2 by applying a phase shift of −2π/3 to the driving signal u. The 4π/3 phase shifter 1904 generates a driving signal u3 by applying a phase shift of −4π/3 to the driving signal u.

The driving signal u1 is supplied to the speaker 12-$i$ (i satisfies mod(i,3)=1). Specifically, the driving signal u1 is quadfurcated and supplied to the speakers 12-1, 12-4, 12-7, and 12-10. The driving signal u2 is supplied to the speaker 12-$i$ (i satisfies mod(i,3)=2). Specifically, the driving signal u2 is quadfurcated and supplied to the speakers 12-2, 12-5, 12-8, and 12-11. The driving signal u3 is supplied to the speaker 12-$i$ (i satisfies mod(i,3)=3). Specifically, the driving signal u3 is quadfurcated and supplied to the speakers 12-3, 12-6, 12-9, and 12-12.

The diagnostic apparatus 10 may be configured that Lobe modes to be driven with the speaker group 11 can be switched. The controller 14 switches Lobe modes in accordance with, e.g., an input from the user. For example, the controller 14 selects a Lobe mode indicated by an input from the user from a plurality of Lobe modes. Specifically, the driving unit 15 includes a plurality of driving circuits corresponding to a plurality of Lobe modes, and the controller 14 uses a driving circuit corresponding to a Lobe mode indicated by an input from the user in order to drive that Lobe mode.

Letting M$_{max}$ be the order of a Lobe mode having the highest order among the plurality of Lobe modes, the number Lp of speakers is 2M$_{max}$+1 or more. For example, when switching the first-order Lobe mode, the second-order Lobe mode, the third-order Lobe mode, and the fourth-order Lobe mode, nine or more speakers 12 are provided. For example, twelve speakers 12 are provided. When driving the first-order Lobe mode, four speakers 12 arranged at an angular interval of π/2 among the twelve speakers 12 may be used. In this case, the speaker arrangement is the 4M arrangement, so the driving circuit for driving the first-order Lobe mode can be implemented by using one phase shifter. When driving the second-order Lobe mode, six speakers 12 arranged at an angular interval of π/3 among the twelve speakers 12 can be used. In this case, the speaker arrangement is the 3M arrangement, so the driving circuit for driving the second-order Lobe mode can be implemented by using two phase shifters. When driving the third-order Lobe mode, all of the twelve speakers 12 can be used. In this case, the speaker arrangement is the 4M arrangement, so the driving circuit for driving the third-order Lobe mode can be implemented by using one phase shifter. When driving the fourth-order Lobe mode, all of the twelve speakers 12 can be used. In this case, the speaker arrangement is the 3M arrangement, so the driving circuit for driving the fourth-order Lobe mode can be implemented by using two phase shifters. Accordingly, the number of phase shifters can be reduced in any of the driving circuits for driving the first- to fourth-order Lobe modes.

Next, a method of diagnosing the structure 19 based on the output from the microphone 13 will be explained.

The speaker group 11 is driven by a driving signal generated based on a LOGSS signal which is an example of a TSP signal. For example, definitional equations of the frequency characteristic of the LOGSS signal are represented by equations (1) to (3) below:

$$LOGSS(i) = \begin{cases} 1 & (i=0) \\ \dfrac{\exp\{-j\alpha \times i \log(i)\}}{\sqrt{i}} & \left(1 \leq i \leq \dfrac{N}{2}\right) \\ \dfrac{\exp(-j\alpha \times (N-i)\log(N-i))}{\sqrt{N-i}} & \left(\dfrac{N}{2}+1 \leq i \leq N-1\right) \end{cases} \quad (1)$$

$$J = (q) \times N \quad (2)$$

$$\alpha = \dfrac{J\pi}{\dfrac{N}{2}\log\left(\dfrac{N}{2}\right)} \quad (3)$$

where N represents the LOGSS signal length, q is an arbitrary real number that makes J be a multiple of 2, and each of N and q is a set variable. In addition, j represents an imaginary number.

From equations (1) to (3), the LOGSS signal is represented by equation (4) below:

$$\text{logss} = \text{Re}[\text{IFFT}(\text{LOGSS})] \quad (4)$$

where Re represents a real part, and IFFT represents inverse Fourier transform.

Note that the definitional equation of the frequency characteristic of a TSP signal for use in general purposes is represented by the following equation:

$$TSP(i) = \begin{cases} \exp\{-j4m\pi \times i^2/N^2\} & \left(0 \leq i \leq \dfrac{N}{2}\right) \\ \exp\{j4m\pi \times (N-i)^2/N^2\} & \left(\dfrac{N}{2}+1 \leq i \leq N-1\right) \end{cases}$$

Assuming that the sampling frequency fs is 44.1 kHz, the LOGSS signal length N is 65536 ($=2^{16}$), and q is ¾, the LOGSS signal represented by equation (4) is a signal shown in FIG. 20. When the signal shown in FIG. 20 is shifted by (N−J)/2, a signal shown in FIG. 21 is obtained. In FIGS. 20 and 21, the vertical axis indicates the signal level, and the horizontal axis indicates the time. The driving unit 15 generates the LOGSS signal represented by equation (4), and shifts the LOGSS signal by (N−J)/2 to generate a driving signal. The signal level of the driving signal is adjusted by using the speaker amplifier 36. Note that the shift amount is not limited to (N−J)/2. As shown in FIG. 21, for example, the shift amount may be set such that the signal level and the change in signal level decrease in an initial section, e.g., a section from 0 sec (1 tap) to 0.1 sec (0.1×fs tap).

Figure 22:
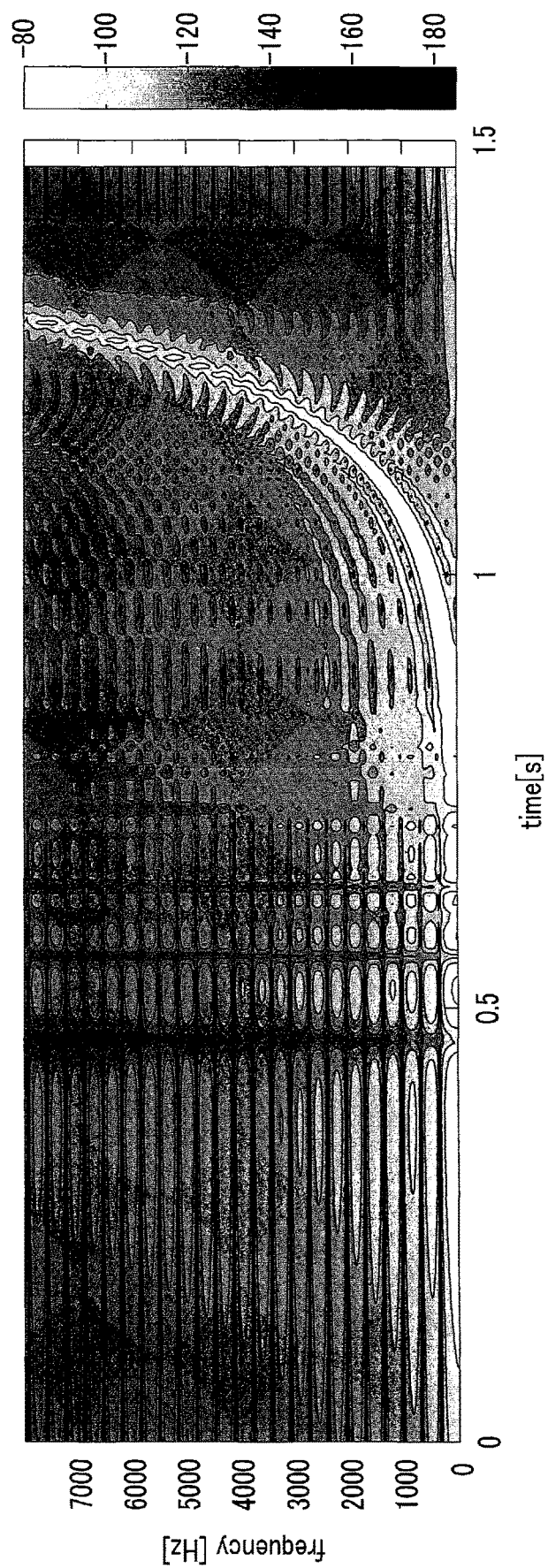
FIG. 22 is a view showing a spectrogram of the LOGSS signal shown in FIG. 21.

FIG. 22 shows the spectrogram of the LOGSS signal shown in FIG. 21. In FIG. 22, the vertical axis indicates the frequency, and the horizontal axis indicates the time. When the vertical axis and the horizontal axis are switched in this spectrogram shown in FIG. 22, the frequency changes in a logarithmic manner. That is, the logarithmic frequency is proportional to the time, and the frequency is an exponential function of the time. Therefore, the relationship between the time and the frequency in the spectrogram of the LOGSS signal is represented by equations (5) to (7) below:

$$t = \dfrac{J}{f_s \log\left(\dfrac{N}{2}\right)} \log\left(f \times \dfrac{N}{f_s}\right) + f_{offset} \quad (5)$$

$$t_{offset} = \dfrac{J}{f_s \log\left(\dfrac{N}{2}\right)} + \dfrac{\text{shift}}{f_s} \quad (6)$$

$$\text{shift} = \dfrac{N-J}{2} \quad (7)$$

where $t_{offset}$ is the offset time, and shift is the shift amount of the LOGSS signal described earlier.

FIG. 23 shows the relationship between the time and the frequency in the spectrogram of the LOGSS signal represented by equations (5) to (7). In FIG. 23, the vertical axis indicates the frequency, and the horizontal axis indicates the time.

If harmonic distortion of the LOGSS signal occurs in this state with no dynamics characteristic, the relationship between the time and the frequency in the spectrogram of the LOGSS signal as shown in FIG. 24 is obtained. FIG. 24 shows a spectrogram when harmonic distortion occurs in the LOGSS signal having the spectrogram shown in FIG. 23. Referring to FIG. 24, a line 2401 is the curve of a fundamental wave response represented by equations (5) to (7), a line 2402 is the curve of a second harmonic response (the response curve of first-order distortion), a line 2403 is the curve of a third harmonic response (the response curve of second-order distortion), a line 2404 is the curve of a fourth harmonic response (the response curve of third-order distortion), and a line 2405 is the curve of a fifth harmonic response (the response curve of fourth-order distortion).

Figure 25:
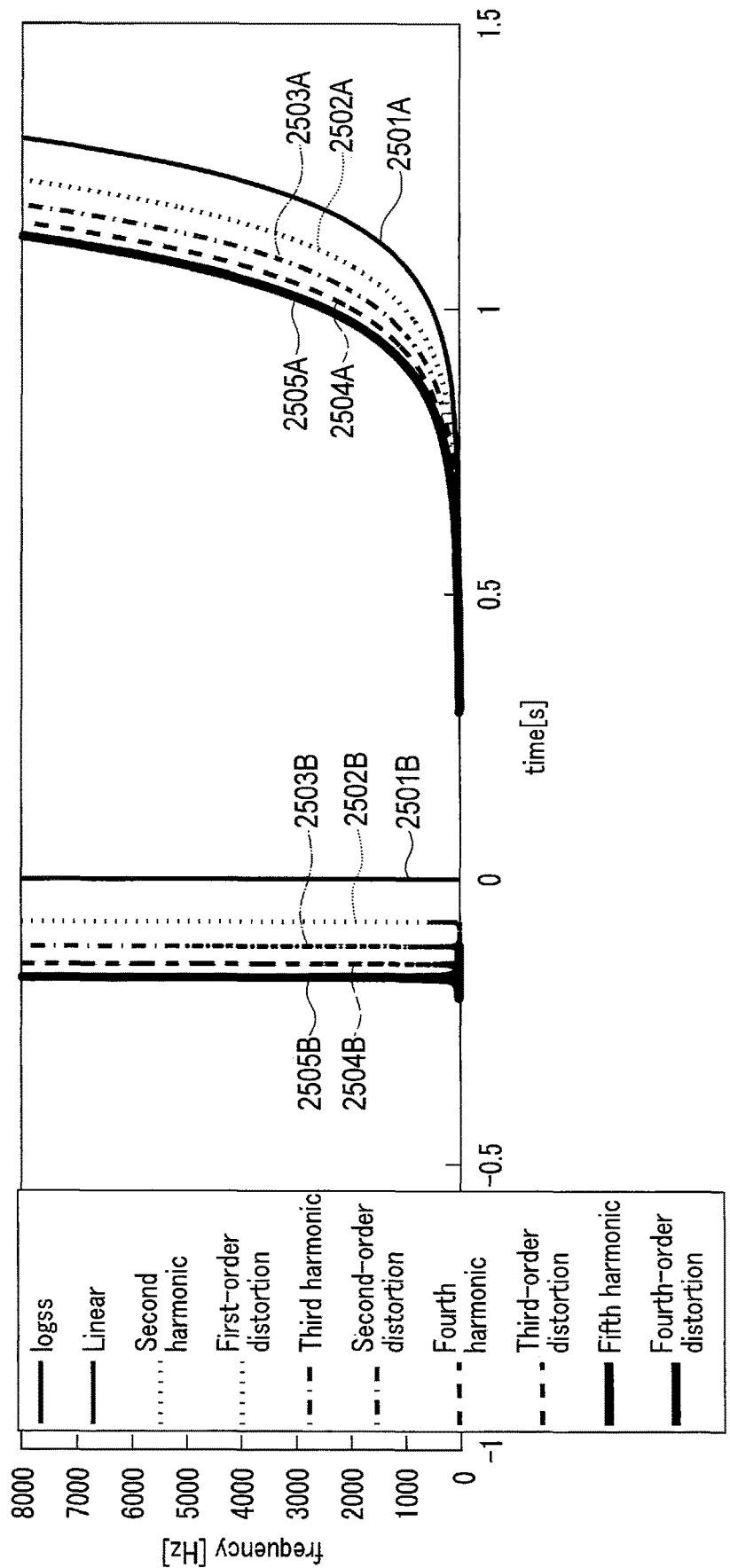
FIG. 25 is a view showing impulse responses calculated from the LOGSS signal having the spectrogram shown in FIG. 24.

In the case where such harmonic distortions of the LOGSS signal occur, when the measured response curves as described above are converted by the inverse characteristic of the LOGSS signal, a graph illustrated in FIG. 25 is obtained. FIG. 25 shows impulse responses obtained by converting the response curves of the LOGSS signal having the spectrogram shown in FIG. 24 by the inverse characteristic of the LOGSS signal. The vertical axis indicates the frequency, and the horizontal axis indicates the time. Lines 2501A to 2505A are respectively response curves of the lines 2401 to 2405 shown in FIG. 24. A line 2501B is an impulse response corresponding to the fundamental wave response. A line 2502B is an impulse response corresponding to the second harmonic response (the distortion characteristic of first-order distortion). A line 2503B is an impulse response corresponding to the third harmonic response (the distortion characteristic of second-order distortion). A line 2504B is an impulse response corresponding to the fourth harmonic response (the distortion characteristic of third-order distortion). A line 2505B is an impulse response corresponding to the fifth harmonic response (the distortion characteristic of fourth-order distortion). The impulse response corresponding to the harmonic response calculated as described above appears in a time region before time 0, i.e., in a negative time region (a region in a noncausal direction). If the distance between the speaker 12 and the microphone 13 is long, however, the rise time of a linear response is delayed, so an impulse response corresponding to the harmonic response occurs in a positive time region in some cases. To simplify the explanation, it is assumed that there is no time delay (no dynamics characteristic) in this embodiment.

The impulse response corresponding to the harmonic response is separated into distortions of the respective orders in the region in the noncausal direction. In this embodiment, the LOGSS signal is used as a driving signal, and this makes it possible to separate the impulse response into distortions of the respective orders, and analyze the distortions of the respective orders by using the distortion characteristics of the distortions of the respective orders. Only a linear response can be obtained when using a normal TSP signal as a driving signal.

By separating the distortion characteristics as described above, the distortion characteristics of the respective orders are separated into different time regions. The occurrence time ($-t_{num}$) [s] of the distortion characteristic of each order is represented by equation (8) below:

$$t_{num} = \dfrac{J}{f_s \log\left(\dfrac{N}{2}\right)} \left\{ \log\left(\dfrac{N(num+1)f_c}{f_s}\right) - \log\left(\dfrac{Nf_c}{f_s}\right) \right\} \quad (8)$$

$$= \dfrac{J}{f_s \log\left(\dfrac{N}{2}\right)} \log(num+1)$$

where num represents the order of distortion.

For example, FIG. 26 shows the occurrence times of the distortion characteristics shown in FIG. 25. In FIG. 26, the horizontal axis indicates the distortion order, and the vertical axis indicates the time.

Figure 27:
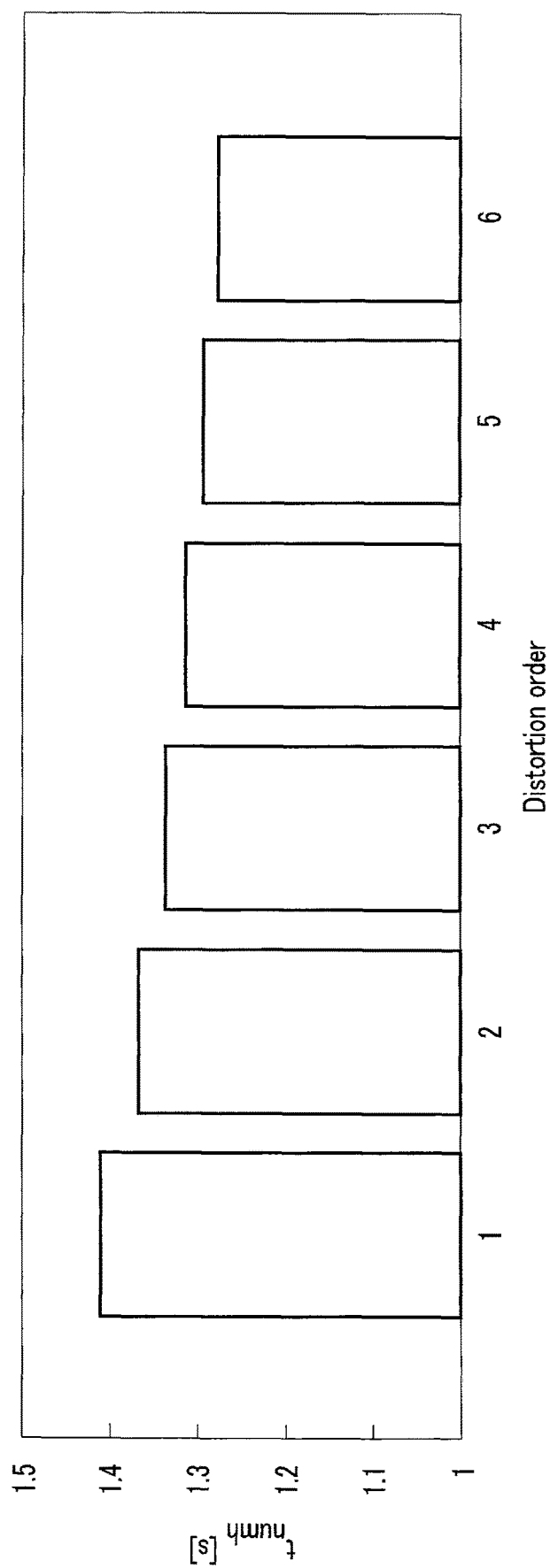
FIG. 27 is a view showing the occurrence times of the distortion characteristics shown in FIG. 25 in the impulse responses.

Then, the distortion occurrence time in the impulse response calculated based on the occurrence time of the distortion characteristic of each order based on the impulse response corresponding to the fundamental wave response is represented by equation (9) below from the repeatability of discrete Fourier transform:

$$t_{num\ h} = \begin{cases} \dfrac{N}{f_s} - t_{num} + t_a & (t_{num} > t_a) \\ t_a - t_{num} & (t_{num} < t_a) \end{cases} \quad (9)$$

where to is the delay time (also called "waste time") of the dynamics characteristic, and is equivalent to the rise time of the first wave in the causal direction satisfying the causality. Letting L be the distance between the speaker 12 and the microphone 13, the delay time $t_a$ is L/c where c is the speed of sound. Technically speaking, the delay time $t_a$ is obtained by adding the delay characteristic of the speaker 12 and the delay characteristic of the system to L/c. For example, when the distance L is sufficiently short and to can be regarded as zero, the occurrence times of the impulse responses are as shown in FIG. 27. In FIG. 27, the horizontal axis indicates the distortion order, and the vertical axis indicates the time.

A method of calculating an impulse response in the impulse response calculation unit 161 will be explained below.

The microphone 13 measures the control sound emitted by the speaker group 11, the control sound reflected by the structure 19, and the vibration sound radiated by the structure 19 as a sound pressure, and generates a measurement signal indicating the sound pressure. As described earlier, the control sound emitted by the speaker group 11 and the control sound reflected by the structure 19 are suppressed on the central axis 18. Accordingly, the measurement signal mainly reflects the vibration sound radiated by the structure 19. The impulse response calculation unit 161 calculates an impulse response based on the measurement signal output from the microphone 13. The impulse response calculation unit 161 calculates an impulse response based on the measurement signal and a driving signal. The driving signal is generated by coupling a plurality of identical TSP signals. In an example using the LOGSS signal as the TSP signal, the driving signal may be generated by coupling K LOGSS signals each of which is the LOGSS signal shown in FIG. 21. In other words, the driving signal may be a signal in which the LOGSS signal shown in FIG. 21 is repeated K times. The impulse response calculation unit 161 generates a plurality of measurement signal pieces by cutting a portion corresponding to the second and subsequent TSP signals by the TSP signal length, and arithmetically averages the plurality of measurement signal pieces. The impulse response calculation unit 161 performs fast Fourier transform (FFT) on the signal obtained by the arithmetic averaging. The impulse response calculation unit 161 multiplies the signal obtained by FFT by the inverse characteristic of the TSP signal. The impulse response calculation unit 161 obtains an impulse response by performing inverse fast Fourier transform (IFFT) on the signal obtained by the multiplication.

Note that it is also possible to use, as the driving signal, a signal obtained by filtering the TSP signal by using a bandpass filter matching the frequency range that can be output by the speaker 12. This enables to raise the output level of the speaker 12. In this case, the impulse response calculation unit 161 may appropriately correct the influence of filtering in the measurement signal, during processing in the frequency region.

Figure 28:
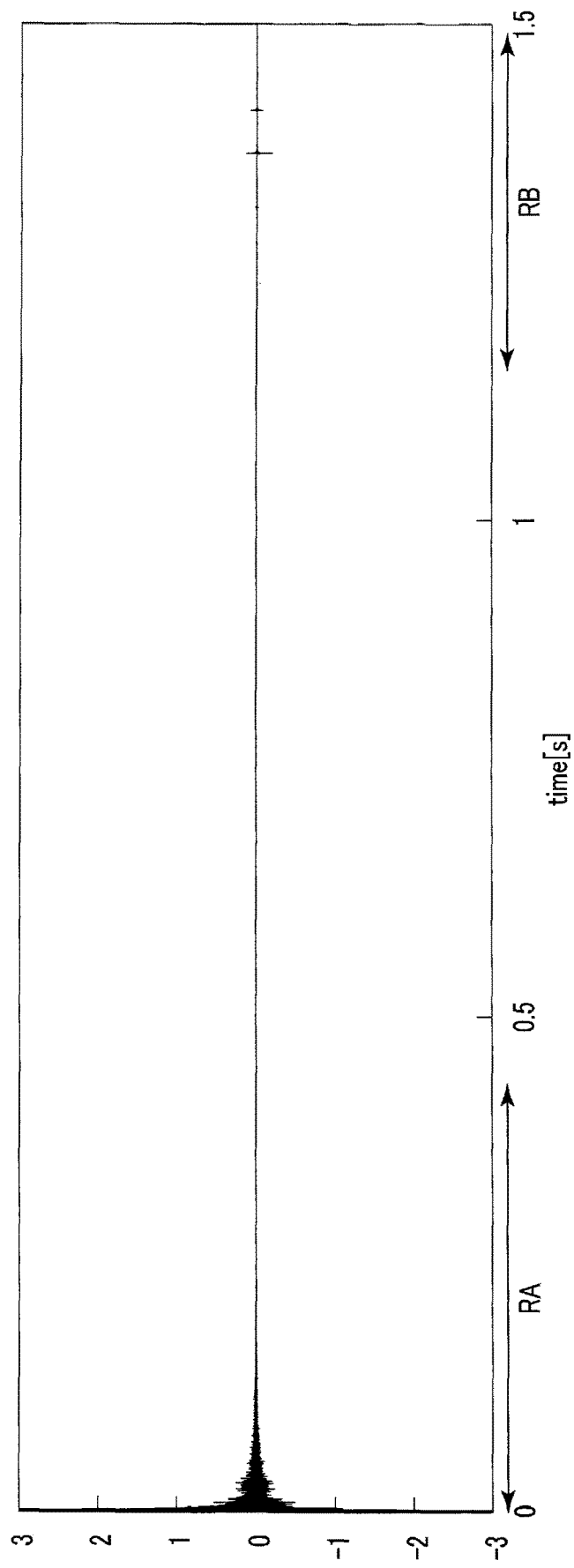
FIG. 28 is a view showing the calculation result of the impulse response according to the embodiment.

FIG. 28 shows an example of the impulse response calculated by the impulse response calculation unit 161. Referring to FIG. 28, the horizontal axis indicates the time, and the vertical axis indicates the level of the impulse response. The impulse response shown in FIG. 28 is the dynamics characteristic derived from a microphone response (measurement signal) corresponding to the control sound based on the LOGSS signal, and including the speaker characteristic, the acoustic space characteristic, and the acoustic characteristic of the structure 19. Therefore, the linear characteristic of the dynamics characteristic appears in a region RA, and the nonlinear characteristic (distortion characteristic) of the dynamics characteristic appears in a region RB. The region RA corresponds to a section (about a few seconds) from the time shortly before the time corresponding to the peak value of the impulse response to the time at which the residual response (echo response) disappears. This section is also referred to as a linear characteristic section. The region RB is set in accordance with the distortion occurrence time (e.g., the distortion occurrence time shown in FIG. 27), in a section other than the linear characteristic section.

Figure 29:
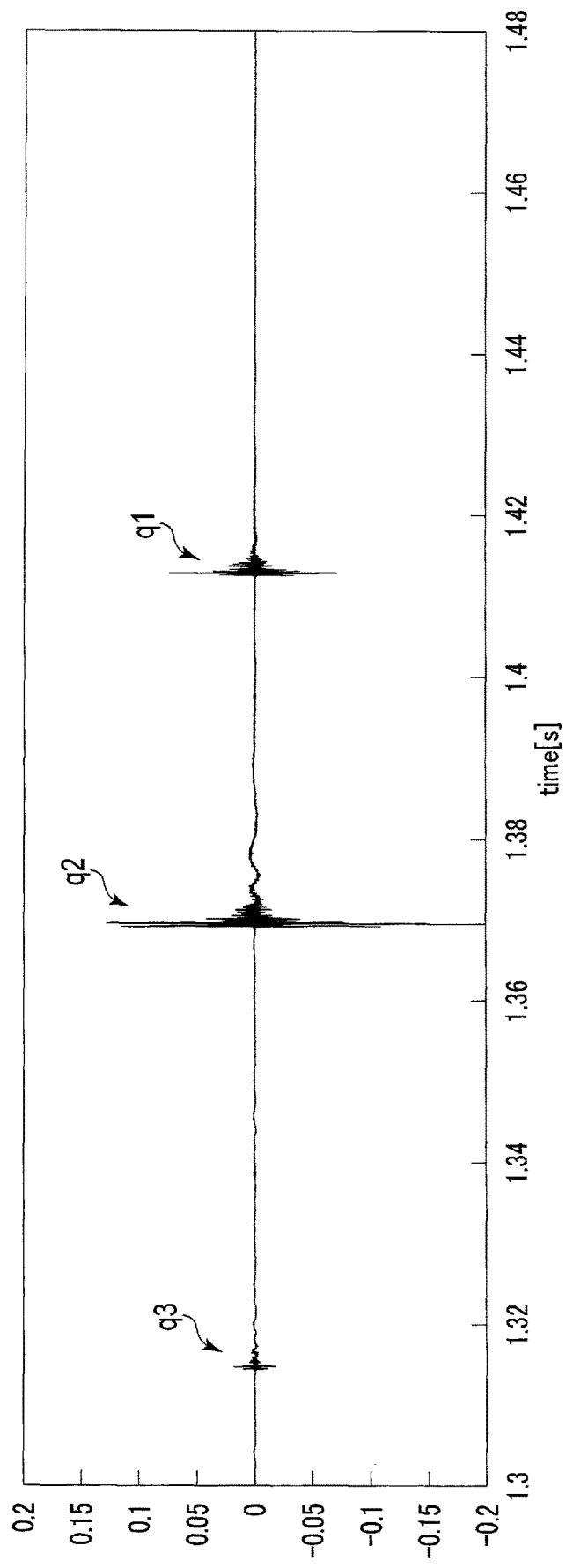
FIG. 29 is an enlarged view of a region corresponding to the nonlinear characteristic of the impulse response shown in FIG. 28.

FIG. 29 is an enlarged view of the region RB corresponding to the nonlinear characteristic of the impulse response. In FIG. 29, the horizontal axis indicates the time, and the vertical axis indicates the level of the impulse response. As shown in FIG. 29, third-order distortion q3, second-order distortion q2, and first-order distortion q1 appear in this order in the impulse response.

A method of calculating the intensity characteristic in the intensity calculation unit 163 shown in FIG. 2 will be explained.

The intensity calculation unit 163 calculates intensity on a line segment connecting the microphones 13 based on two impulse responses calculated by the impulse response calculation unit 161. In this example, the microphone 13-1 is a reference, and the microphones 13-1 and 13-2 are arranged in this order in an intensity measurement axis positive direction.

Letting $G_1(\omega)$ be a transmission characteristic obtained by the microphone 13-1 and $G_2(\omega)$ be a transmission characteristic obtained by the microphone 13-2, active intensity $I(\omega)$ can be represented by equation (10) below:

$$I(\omega) = \dfrac{-1}{\omega \rho d} \mathrm{Im}(G_1^*(\omega) G_2(\omega)) \quad (10)$$

where * is a complex conjugate, d is the distance between the microphones 13, and ρ is the air density.

Each transmission characteristic is calculated by performing FFT on the impulse response. For example, the impulse response calculation unit 161 calculates an impulse response based on the measurement signal output from the microphone 13-1, and the intensity calculation unit 163 calculates the transmission characteristic $G_1(\omega)$ by performing FFT on this impulse response. Also, the impulse response calculation unit 161 calculates an impulse response based on the measurement signal output from the microphone 13-2, and the intensity calculation unit 163 calculates the transmission characteristic $G_2(\omega)$ by performing FFT on this impulse response. The intensity calculation unit 163 calculates the active intensity $I(\omega)$ based on the transmission characteristics $G_1(\omega)$ and $G_2(\omega)$.

To calculate the transmission characteristic, the intensity calculation unit 163 may perform FFT on a linear characteristic section of the impulse response. As an example, the intensity calculation unit 163 may perform FFT on the whole impulse response after changing values in sections other than the linear characteristic section of the impulse response to zero. In another example, the intensity calculation unit 163 may cut out a portion from the impulse response to the linear characteristic section, and perform FFT on the cut portion of the impulse response.

Reactive intensity $Q(\omega)$ can be represented by equation (11) below:

$$Q(\omega) = \frac{G_1^*(\omega)G_1(\omega) - G_2^*(\omega)G_2(\omega)}{2\omega\rho d} \qquad (11)$$

In the intensity calculation, the particle velocity is approximated by using the two microphones 13 spaced apart by the distance d. When the measurement accuracy is taken into consideration, therefore, a frequency (f=c/(10d)) corresponding to $\lambda$=10d is used as the upper limit of the frequency range. A portion corresponding to a frequency range equal to or lower than the frequency (f=c/(10d)) in the intensity is used in state evaluation.

Note that if the value of FFT is directly used in a high-frequency band exceeding 1 kHz, the intensity characteristic display becomes noisy. Therefore, a value obtained by averaging the gain and the phase at a few Hz before and after the frequency band is returned to a complex number, and the intensity is calculated by using this complex number as the FFT value.

Figure 30:
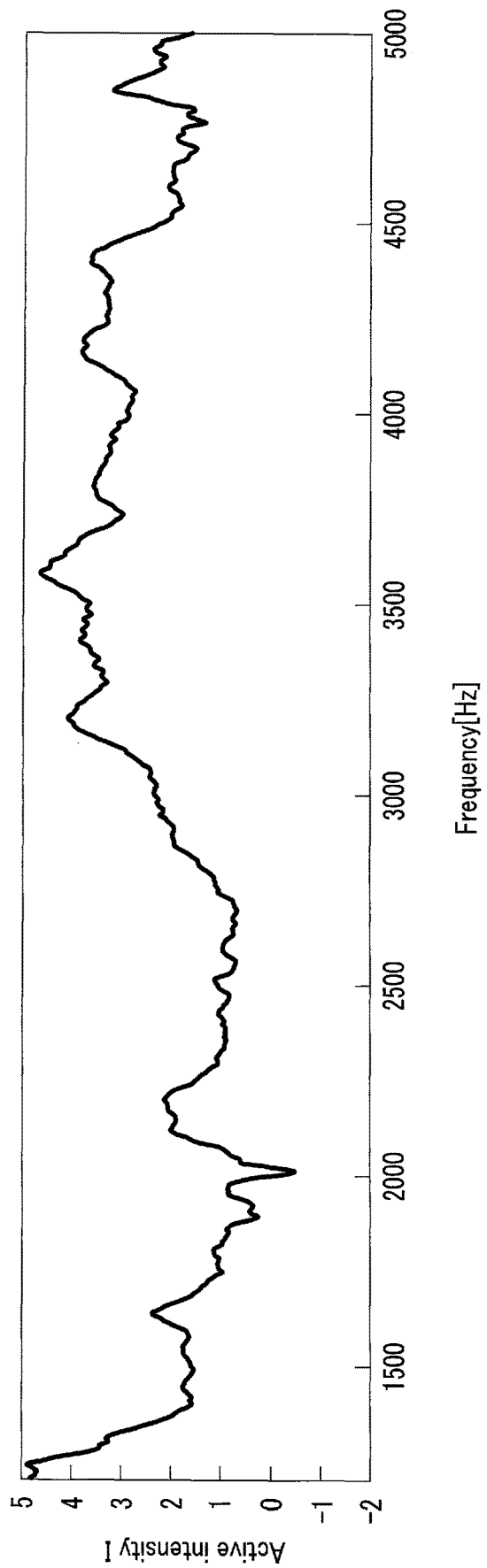
FIG. 30 is a view showing the calculation result of active intensity according to the embodiment.

FIG. 30 shows an example of active intensity calculated by the intensity calculation unit 163 when the inter-microphone distance d is 5 [mm]. FIG. 31 shows an example of reactive intensity calculated by the intensity calculation unit 163 when the inter-microphone distance d is 5 [mm]. In each of FIGS. 30 and 31, the horizontal axis indicates the frequency, and the vertical axis indicates the intensity level. In these examples, a value obtained by averaging the gain and the phase at 20 Hz before and after the frequency band is returned to a complex number, and this complex number is used as the FFT value.

Methods of diagnosing the structure 19 in the evaluation unit 162 will be explained below.

A first diagnostic method diagnoses the deterioration state of the structure 19 based on the comparison between analysis data and a baseline. The analysis data includes least one of the transmission characteristic calculated from the impulse response, the active intensity, and the reactive intensity. That is, the analysis data includes the transmission characteristic, the active intensity, and/or the reactive intensity. The baseline is generated beforehand and registered in the evaluation unit 162. For example, the baseline is generated based on analysis data obtained by performing measurements on a structure in which a failure mode such as adhesion loss, poor welding, crack formation, or cavity formation has occurred, and on a structure in which a failure within an allowable range has occurred.

In an example using one microphone 13 as shown in FIG. 1, the evaluation unit 162 calculates the transmission characteristic of the vibration sound radiated by the structure 19 from the impulse response calculated by the impulse response calculation unit 161, and evaluates the deterioration of the structure 19 by comparing the transmission characteristic with a threshold transmission characteristic as the baseline.

In an example using two microphones 13 as shown in FIG. 2, the evaluation unit 162 evaluates the deterioration of the structure 19 by comparing the intensity characteristic calculated by the intensity calculation unit 163 with the threshold intensity characteristic corresponding to the baseline. For example, the evaluation unit 162 determines that the structure 19 has deteriorated if the calculated active intensity exceeds the threshold active intensity or if the calculated reactive intensity exceeds the threshold reactive intensity.

A second diagnostic method is aging deterioration progress diagnosis. The second diagnostic method includes monitoring a time-series change of analysis data. For example, the evaluation unit 162 determines whether active intensity has deteriorated, based on the calculation results of active intensity at a plurality of points of time. The evaluation unit 162 determines that aging deterioration has occurred in the structure 19 if the active intensity is increasing or decreasing. It is also possible to use a transmission characteristic and/or reactive intensity instead of or in addition to the active intensity.

A third diagnostic method is a damping material peeling diagnosis. Generally, when a damping member peels off in a structure, a plate member becomes vibrative. As the peeing advances, the plate member becomes more vibrative, so the vibration sound radiated from the structure 19 becomes louder. In one example, the evaluation unit 162 determines whether the sound pressure tends to increase, based on the calculation results of the transmission characteristic at a plurality of points of time. If the sound pressure tends to increase, the evaluation unit 162 determines that the damping member is peeling off. In another example, the evaluation unit 162 determines that the damping member is peeling off, based on the calculation result of active intensity. When the structure 19 is in the intensity measurement axis positive direction, the active intensity reduces as the radiated sound becomes louder.

Note that the vibration sound radiated from the structure 19 may not linearly change with respect to the magnitude of the control sound from the speaker group 11 in many cases. Deterioration can also be evaluated by changing the sound volume of the speaker amplifier 36 from the reference sound volume and evaluating a change in difference between a sound pressure obtained at the reference sound volume and a sound pressure obtained at the changed sound volume, or by evaluating a change in ratio of intensity obtained at the changed sound volume to intensity obtained at the reference sound volume. For example, when the sound pressure of the vibration sound linearly changes with respect to the sound pressure of the control sound, the sound volume is increased by a [dB] from the reference sound volume. Consequently, the abovementioned difference becomes a [dB], and the abovementioned ratio becomes $(10^{a/20})^2$.

When driving the speaker group 11 by using the LOGSS signal, the waveform of the distortion characteristic is contained in the impulse response, and this waveform can be separated and extracted, as described earlier. In this case, the sound pressure and intensity of the distortion characteristic can also be evaluated, so deterioration of the structure 19 can be evaluated by evaluating a change in distortion characteristic such as "chattering vibration" as well.

In the diagnostic apparatus 10 according to this embodiment as described above, the speakers 12 included in the speaker group 11 are arranged at equal angular intervals on the circumference of a circle, and the speaker group 11 emits a control sound to the structure 19 by using the speakers 12. The microphone 13 is arranged on the central axis 18 of the circle, and measures a vibration sound radiated from the structure 19 in response to the control sound. The diagnostic unit 16 diagnoses the structure 19 based on the output from the microphone 13. In this configuration, the structure 19 can be diagnosed in a non-contact manner. For example, the sign of deterioration of the structure 19 can be detected.

A specific diagnostic method such as a hammering test requires an operator to have a professional skill. The diagnostic apparatus 10 according to this embodiment does not require an operator to have a professional skill, and enables the operator to easily diagnose the structure 19.

The driving unit 15 generates a driving signal for driving the speaker group 11 based on the TSP signal. The speaker group 11 emits a control sound based on the driving signal. This configuration makes diagnosis in a broad frequency band possible, and improves the reliability of the diagnosis.

A phase difference depending on the number Lp of speakers and on the order M of the Lobe mode is set between two speakers adjacent to each other on the circumference of a circle. The phase difference is, e.g., $2\pi M/Lp$. The above-mentioned driving signal contains Lp driving signals for driving Lp speakers 12-1 to 12-Lp. Assuming that the speakers 12-1 to 12-Lp are arranged in this order along the rotational direction of the Lobe mode on the circumference of the circle, a driving signal for driving the speaker 12-$i$ is delayed by a phase of $2\pi M/Lp$ from a driving signal for the speaker 12-($i$−1). In this configuration, the speaker group 11 emits an Mth-order-Lobe-mode control sound, and the sound pressure of the control sound is in principle zero on the central axis 18. As a consequence, the microphone 13 can efficiently detect a vibration sound radiated from the structure 19.

The supporting part may support the speakers 12 so that the radius of the circle is adjustable. This configuration makes the diagnostic apparatus 10 usable in diagnoses from a local diagnosis to a global diagnosis. The supporting part can support the microphone 13 such that the distance between the speaker group 11 and the microphone 13 is adjustable. This configuration makes it easy to take a measure to reduce the influence of ambient reflection.

The diagnostic unit 16 calculates an impulse response based on a measurement signal from the microphone 13, and evaluates the state of the structure 19 based on the calculation result of the impulse response. When two microphones 13 (microphones 13-1 and 13-2) are provided, the diagnostic unit 16 calculates an impulse response based on a measurement signal from the microphone 13-1, calculates an impulse response based on a measurement signal from the microphone 13-2, calculates the intensity characteristic of a vibration sound on the central axis 18 based on the two impulse responses, and evaluates the state of the structure 19 based on the calculation result of the intensity characteristic. The acoustic characteristic of a vibration sound radiated from the structure 19 reflects not only the surface state of the structure 19 but also the state of the internal structure of the structure 19. Therefore, it is also possible to detect a change in state of the internal structure of the structure 19.

In the above-described embodiment, a TSP signal is used as the driving signal. However, a signal other than the TSP signal may be used as the driving signal. For example, it is also possible to use, as the driving signal, a single-frequency sine wave having a specific frequency component, a multiple-frequency sine wave containing a plurality of frequency components, or a pulse wave (a Gaussian pulse or the like). In this case, the diagnostic unit 16 diagnoses a target by evaluating the characteristics of a sound measured by the microphone 13, without calculating any impulse response.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A diagnostic apparatus comprising:
a sound-emitting unit including a plurality of speakers arranged at equal angular intervals on a circumference of a circle, the sound-emitting unit being configured to emit a first vibration sound to a target by using the speakers;
at least one measurement unit arranged on a central axis of the circle, the at least one measurement unit being configured to measure a vibration of the target generated in response to the first vibration sound, or a second vibration sound radiated from the target due to the vibration; and
a processor configured to diagnose the target based on an output from the at least one measurement unit,
wherein the sound-emitting unit includes Lp speakers as the speakers, and is configured to emit a vibration sound in a Lobe mode as the first vibration sound, $Lp \geq 2M+1$ is satisfied where M ($M \geq 1$) is an order of the Lobe mode, and a phase difference depending on Lp and M is set between two speakers adjacent to each other on the circumference.

2. The apparatus according to claim 1, further comprising a driving unit configured to generate a driving signal for driving the sound-emitting unit based on a TSP (Time Stretched Pulse) signal,
wherein the sound-emitting unit is configured to emit the first vibration sound based on the driving signal.

3. The apparatus according to claim 1, wherein the at least one measurement unit is arranged between the sound-emitting unit and the target.

4. The apparatus according to claim 1, wherein the phase difference is $2\pi M/Lp$.

5. The apparatus according to claim 1, further comprising a supporting part configured to support the speakers to adjust a radius of the circle.

6. The apparatus according to claim 5, wherein the supporting part is further configured to support the at least one measurement unit to adjust a distance between the sound-emitting unit and the at least one measurement unit.

7. The apparatus according to claim 1, wherein
the at least one measurement unit includes a first measurement unit configured to measure the second vibration sound to generate a measurement signal, and
the processor is configured to:
calculate an impulse response based on the measurement signal; and
evaluate a state of the target based on the impulse response.

8. The apparatus according to claim 1, wherein
the at least one measurement unit includes a first measurement unit configured to measure the second vibration sound to generate a first measurement signal, and a second measurement unit configured to measure the second vibration sound to generate a second measurement signal, and
the processor is configured to:
calculate a first impulse response based on the first measurement signal;
calculate a second impulse response based on the second measurement signal;
calculate an intensity characteristic of the second vibration sound based on the first impulse response and the second impulse response; and
evaluate the target based on the intensity characteristic.

9. The apparatus according to claim 8, wherein the intensity characteristic includes at least one of active intensity indicating a flow of energy of a sound wave on the central axis or reactive intensity indicating a gradient of the square of sound pressure on the central axis.

10. A diagnostic apparatus comprising:
a sound-emitting unit including a plurality of speakers arranged at equal angular intervals on a circumference of a circle, the sound-emitting unit being configured to emit a first vibration sound to a target by using the speakers;
at least one measurement unit arranged on a central axis of the circle, the at least one measurement unit being configured to measure a vibration of the target generated in response to the first vibration sound, or a second vibration sound radiated from the target due to the vibration; and
a processor configured to diagnose the target based on an output from the at least one measurement unit,
wherein the sound-emitting unit includes $L_p$ speakers as the speakers, is configured to emit a vibration sound in a Lobe mode as the first vibration sound, the Lobe mode being selected from a plurality of Lobe modes, and $L_p \geq 2M_{max}+1$ is satisfied where $M_{max}$ is a maximum value of orders of the plurality of Lobe modes.

11. A diagnostic method comprising:
emitting a first vibration sound to a target by using speakers arranged at equal angular intervals on a circumference of a circle;
measuring a vibration of the target generated in response to the first vibration sound, or a second vibration sound radiated from the target due the vibration, by using at least one measurement unit arranged on a central axis of the circle; and
diagnosing the target based on an output from the at least one measurement unit,
wherein emitting the first vibration sound uses $L_p$ speakers as the speakers to emit a vibration sound in a Lobe mode as the first vibration sound, $L_p \geq 2M+1$ is satisfied where M ($M \geq 1$) is an order of the Lobe mode, and a phase difference depending on $L_p$ and M is set between two speakers adjacent to each other on the circumference.

* * * * *